(12) United States Patent
Kanemoto et al.

(10) Patent No.: US 12,197,476 B2
(45) Date of Patent: Jan. 14, 2025

(54) INFORMATION PROCESSING APPARATUS AND INFORMATION PROCESSING METHOD

(71) Applicant: SONY GROUP CORPORATION, Tokyo (JP)

(72) Inventors: Katsuyoshi Kanemoto, Tokyo (JP); Michael Siegfried Spranger, Tokyo (JP); Akihito Kumakura, Tokyo (JP); Kojiro Kashiwa, Tokyo (JP); Yasuhiro Matsuda, Tokyo (JP); Yohei Yamanaka, Tokyo (JP); Jin Nakayama, Tokyo (JP); Masaaki Nagata, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 377 days.

(21) Appl. No.: 17/596,670

(22) PCT Filed: Jun. 18, 2020

(86) PCT No.: PCT/JP2020/023911
§ 371 (c)(1),
(2) Date: Oct. 27, 2022

(87) PCT Pub. No.: WO2020/262183
PCT Pub. Date: Dec. 30, 2020

(65) Prior Publication Data
US 2023/0054525 A1    Feb. 23, 2023

(30) Foreign Application Priority Data
Jun. 25, 2019    (JP) ................ 2019-116963

(51) Int. Cl.
*G06F 16/31* (2019.01)
*G06F 16/33* (2019.01)
*G06F 16/35* (2019.01)

(52) U.S. Cl.
CPC ........ *G06F 16/313* (2019.01); *G06F 16/3347* (2019.01); *G06F 16/35* (2019.01)

(58) Field of Classification Search
None
See application file for complete search history.

(56) References Cited

U.S. PATENT DOCUMENTS

2008/0195378 A1    8/2008    Nakazawa et al.
2009/0100371 A1*   4/2009    Hu ........................ G06Q 10/06
                                                                715/780

(Continued)

FOREIGN PATENT DOCUMENTS

JP    2006-293607 A    10/2006
JP    2016-118833 A     6/2016
WO    2006/085661 A1    8/2006

OTHER PUBLICATIONS

International Search Report and Written Opinion of PCT Application No. PCT/JP2020/023911, issued on Aug. 25, 2020, 09 pages of ISRWO.

*Primary Examiner* — Thu N Nguyen
(74) *Attorney, Agent, or Firm* — CHIP LAW GROUP

(57) ABSTRACT

There is provided an information processing apparatus which includes a creation unit and a processing unit. The creation unit is configured to create support information for supporting at least one of construction and maintenance of a database on the basis of first information including a representative question and an answer sentence associated with the representative question and stored in the database stored in a storage unit and second information indicating a history of reception with respect to a user. The processing (Continued)

unit is configured to execute processing of performing at least one of construction and maintenance of the database on the basis of input information input to the support information created by the creation unit.

18 Claims, 17 Drawing Sheets

(56) References Cited

U.S. PATENT DOCUMENTS

| | | | | |
|---|---|---|---|---|
| 2013/0006915 | A1* | 1/2013 | Gunawardana | G06N 7/01 706/52 |
| 2013/0204614 | A1* | 8/2013 | Hirao | G06F 40/205 704/9 |
| 2014/0254941 | A1* | 9/2014 | Schwartz | G06V 30/387 382/202 |
| 2017/0083969 | A1* | 3/2017 | Takeda | G06F 16/951 |
| 2020/0311575 | A1* | 10/2020 | Kong | G06V 10/774 |

* cited by examiner

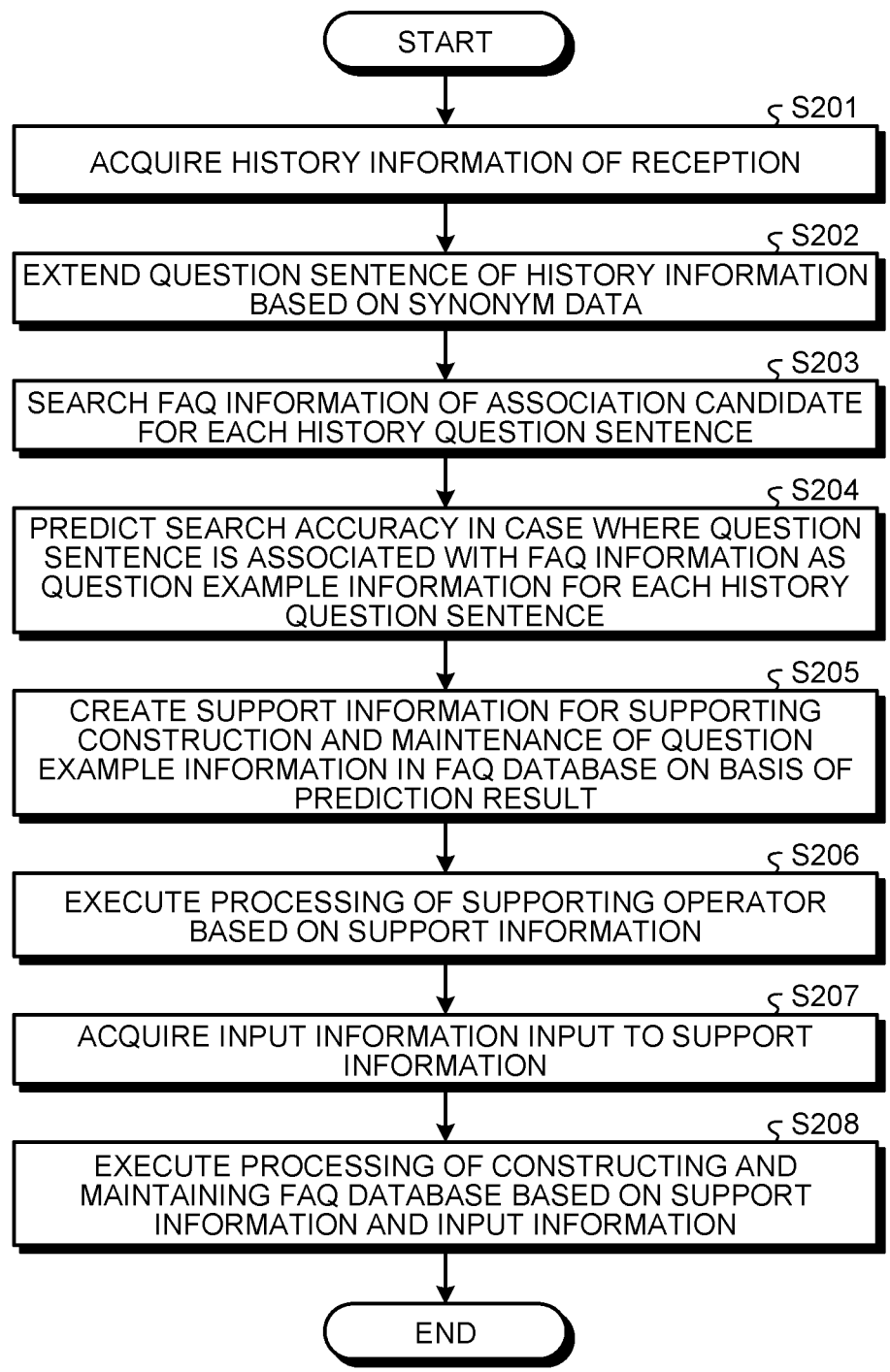

FIG.12

| | | | D100 | |
|---|---|---|---|---|
| | 401 | 402 | 403 | 404 | 405 |

| | | | | |
|---|---|---|---|---|
| HISTORY -1 | | | CD DOES NOT COME OUT | |
| | SCORE | REPRESENTATIVE QUESTION | ANSWER | EVALUATION |
| | 0.8 | CD/DVD CANNOT BE EJECTED | IF CD/DVD CANNOT BE TAKEN OUT... | [POSITIVE EXAMPLE] [HIDE] [NEGATIVE EXAMPLE] |
| | 0.5 | CD/DVD CANNOT BE PLAYED | REASON WHY CD/DVD CANNOT BE PLAYED IS... | [POSITIVE EXAMPLE] [HIDE] [NEGATIVE EXAMPLE] |
| HISTORY -2 | | | DVD DOES NOT COME OUT | |
| | SCORE | REPRESENTATIVE QUESTION | ANSWER | EVALUATION |
| | 0.8 | CD/DVD CANNOT BE EJECTED | IF CD/DVD CANNOT BE TAKEN OUT... | [POSITIVE EXAMPLE] [HIDE] [NEGATIVE EXAMPLE] |
| | 0.5 | CD/DVD CANNOT BE PLAYED | REASON WHY CD/DVD CANNOT BE PLAYED IS... | [POSITIVE EXAMPLE] [HIDE] [NEGATIVE EXAMPLE] |

FIG.13

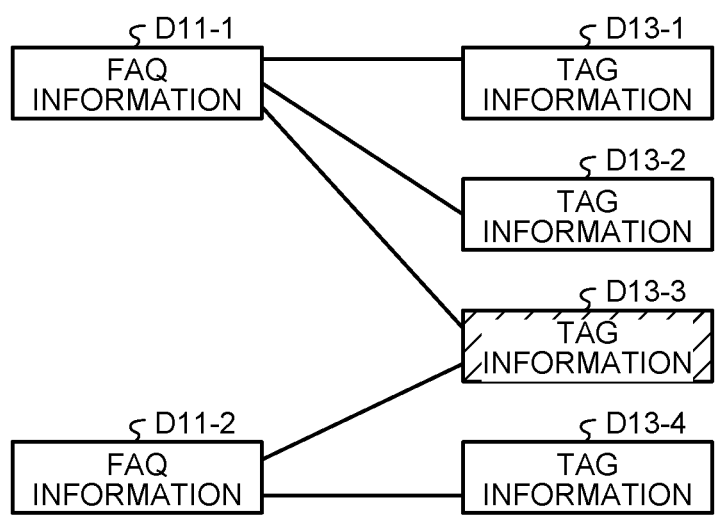

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2020/023911 filed on Jun. 18, 2020, which claims priority benefit of Japanese Patent Application No. JP 2019-116963 filed in the Japan Patent Office on Jun. 25, 2019. Each of the above-referenced applications is hereby incorporated herein by reference in its entirety.

FIELD

The present disclosure relates to an information processing apparatus, an information processing method, and a program.

BACKGROUND

With the diversification of electronic devices, it is necessary to accurately and quickly search information corresponding to a user's question from among enormous information regarding the electronic devices. The information corresponding to the user's question includes, for example, information such as an instruction manual, a past case, frequently asked questions (FAQ), and the like. Patent Literature 1 discloses a system that breaks down an input sentence to extract a keyword, and searches information included in an instruction manual or FAQ using a keyword similar to the keyword.

CITATION LIST

Patent Literature

Patent Literature 1: JP 2006-293607 A

SUMMARY

Technical Problem

In the above-described conventional technology, for example, when information is searched from FAQ, how a question and an answer sentence to the question can be constructed and maintained is important. However, since it is difficult to automatically construct and maintain a question and an answer sentence, it is desired that an operator efficiently construct and maintain an FAQ database.

Therefore, the present disclosure proposes an information processing apparatus, an information processing method, and a program capable of suppressing a burden on an operator who constructs and maintains a representative question and an answer sentence.

Solution to Problem

To solve the problems described above, an information processing apparatus according to an embodiment of the present disclosure includes: a creation unit configured to create support information for supporting at least one of construction and maintenance of a database on the basis of first information including a representative question and an answer sentence associated with the representative question and stored in the database stored in a storage unit and second information indicating a history of reception with respect to a user; and a processing unit configured to execute processing of performing at least one of construction and maintenance of the database on the basis of input information input to the support information created by the creation unit.

Moreover, an information processing method by a computer according to an embodiment of the present disclosure includes: creating support information for supporting at least one of construction and maintenance of a database on the basis of first information including a representative question and an answer sentence associated with the representative question and stored in the database stored in a storage unit and second information indicating a history of reception with respect to a user; and executing processing of performing at least one of construction and maintenance of the database on the basis of input information input to the created support information.

Moreover, a program according to an embodiment of the present disclosure causes a computer to function as: a creation unit configured to create support information for supporting at least one of construction and maintenance of a database on the basis of first information including a representative question and an answer sentence associated with the representative question and stored in the database stored in a storage unit and second information indicating a history of reception with respect to a user; and a processing unit configured to execute processing of performing at least one of construction and maintenance of the database on the basis of input information input to the support information created by the creation unit.

BRIEF DESCRIPTION OF DRAWINGS

FIG. 11 is a flowchart illustrating an example of a procedure of information processing related to association support of question example information.

FIG. 12 is a diagram illustrating an example of support information related to association support of question example information.

FIG. 13 is a diagram illustrating an example of association between FAQ information and tag information.

DESCRIPTION OF EMBODIMENTS

Figure 1:
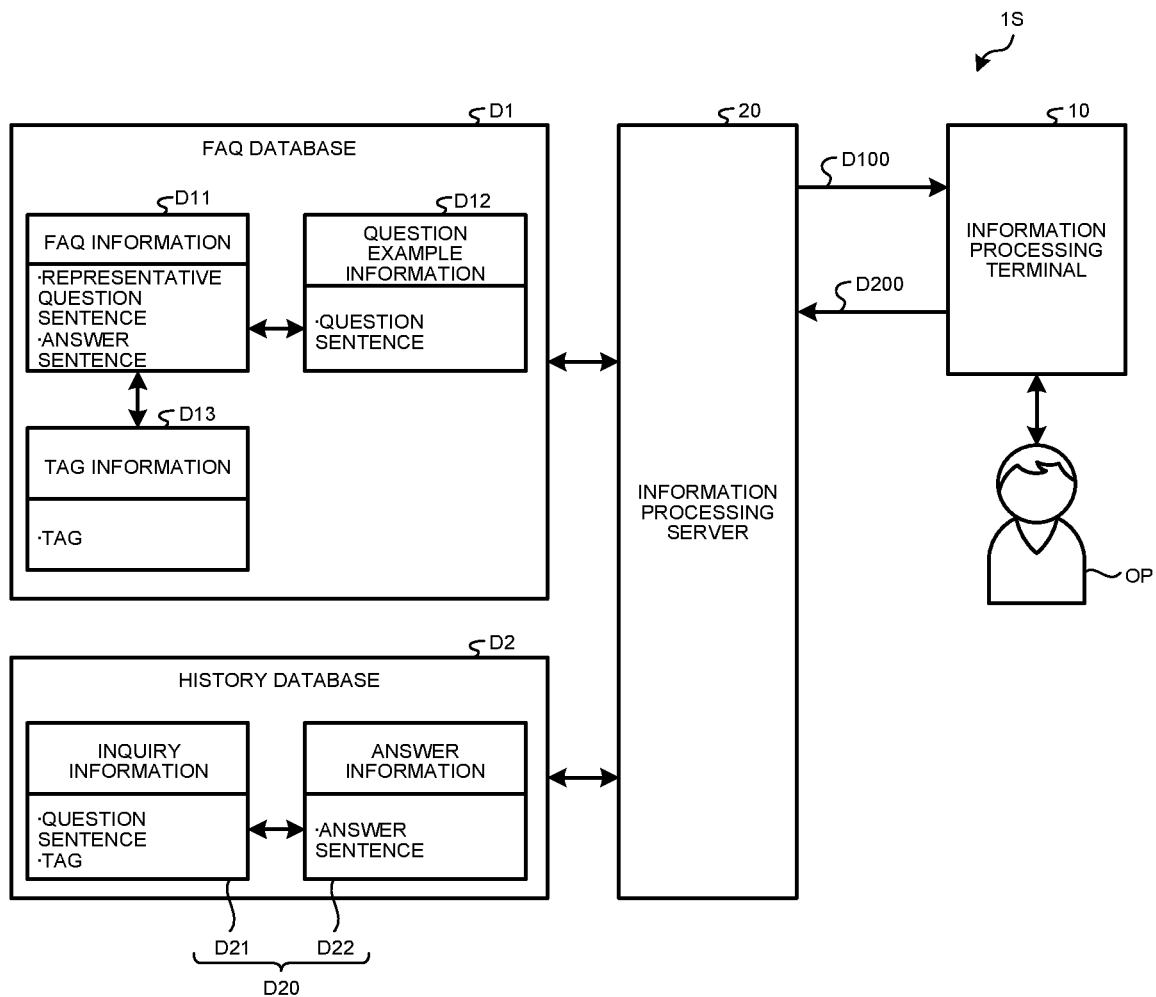
FIG. 1 is a diagram for explaining an example of an information treatment apparatus according to a first embodiment.

The embodiment of the present disclosure will be described below in detail on the basis of the drawings. Note that, in each embodiment described below, the same parts are designated by the same reference numerals, and duplicate description will be omitted.

First Embodiment

[Outline of the Information Processing Apparatus According to the First Embodiment]

FIG. 1 is a diagram for explaining an example of an information treatment apparatus according to the first embodiment. As illustrated in FIG. 1, an information processing apparatus 1S is an information processing system including an information processing terminal 10 and an information processing server 20. The information processing terminal 10 and the information processing server 20 are, for example, configured to be capable of communication via a network or direct communication without the network. Note that the information processing apparatus 1S according to the present disclosure may be implemented by, for example, a single computer, three or more computers, or the like. In the present embodiment, an operator OP is a person who performs construction and maintenance related to databases. The user is a person who uses the databases.

The information processing terminal 10 is, for example, a personal computer used by the operator OP. The information processing terminal 10 performs various types of information processing in cooperation with the information processing server 20. For example, the information processing terminal 10 performs processing of causing the operator OP who has received an inquiry from the user to input the inquiry content and an answer. The information processing terminal 10 has a function of transmitting data input by the operator OP to the information processing server 20. The information processing terminal 10 has a function of displaying various types of information received from the information processing server 20 on a display unit.

The information processing server 20 is a so-called cloud server. The information processing server 20 is a server apparatus that executes information processing in cooperation with the information processing terminal 10. The information processing server 20 may execute information processing in cooperation with a plurality of information processing terminals 10. The information processing server 20 has a function of managing a set of a representative question and an answer indicating a solution method for the representative question for each problem in order to support the user. For example, the information processing server 20 has a function of managing various types of information such as a FAQ database D1 and a history database D2. The FAQ database D1 and the history database D2 are stored, for example, in a storage apparatus accessible by the information processing server 20. The FAQ database D1 stores a plurality of pieces of FAQ information D11. The FAQ information D11 is, for example, information indicating a pair of a representative question sentence and an answer sentence associated with the representative question sentence. The history database D2 stores a plurality of pieces of inquiry information D21 and answer information D22 in association with each other. The information processing server 20 has a function of searching a representative question from the FAQ database D1 and causing the information processing terminal 10 to output the search result to the user. In the information processing server 20, the information processing server 20 has a function of managing the inquiry information D21 and the answer information D22.

For example, the user generally searches a description, a keyword, or the like regarding a situation in which the user is in trouble as a search query. The search query includes, for example, words, sentences, and the like input by the user when searching. Therefore, in order to search an answer, it is empirically known that searching an answer from a representative question is more accurate than searching an answer from an answer. Furthermore, the user's question is searched in various expressions using general words rather than specialized words. Therefore, it is known that search accuracy is improved by preparing not only representative questions but also question examples in various expressions, associating the question examples with the FAQ information D11 or the like, and incorporating the question examples into a search model. The search model is, for example, a mechanism of comparing information of an inquiry input by the user with information of the FAQ database D1 and searching the FAQ information D11 suitable for the inquiry. The search model uses general information such as question examples, tag information, and a relationship with other pieces of FAQ information D11, and includes a model obtained by machine learning. For example, the search model includes a model in which the question example is used as learning data of a text classifier in machine learning. Therefore, constructing and maintaining the FAQ database D1 is an important problem in increasing the coverage for the user's question and urging appropriate solution. Furthermore, constructing and maintaining a question example associated with the FAQ information D11 is an important problem in improving search accuracy of the FAQ information D11 for the user's question.

Furthermore, in a case where the FAQ information D11 is searched, there is a case where the FAQ information D11 to be presented differs depending on conditions such as a state of the user and an electronic device to be questioned. For example, in the case of an electronic device, in a case where first FAQ information D11 is valid and second FAQ information D11 is not valid, a certain model A associates tag information D13 of the model A with the first FAQ information D11. Thus, the user can specify the tag information D13 of the model A as the search query by specifying the model A at the time of searching. As a result, the user does not set the second FAQ information D11 with which the tag information D13 of the model A is not associated as the search target, and can search from the FAQ information D11 with which the tag information D13 of the model A is associated such as the first FAQ information D11. Therefore, in order to improve the search accuracy of the FAQ information D11, the information processing apparatus 1S is desired to perform support of associating many pieces of accurate tag information D13 with the FAQ information D11.

Furthermore, reception, when performed to the user via the operator OP, includes the operator OP creating an answer sentence based on an existing business document with respect to a question from the user. In this case, the question sentence from the user, the tag specified at that time, and the answer sentence at that time are recorded in association with each other. On the other hand, regarding the reception, in a case where the user searches the FAQ information D11 without via the operator OP, since it is not known whether the searched FAQ information D11 is appropriate, only the inquiry result is recorded. In order to improve the performance of searching the FAQ information D11, it is desirable to reflect the reception result in the FAQ database D1, but it is difficult to extract information that can be reflected in the FAQ database D1 from a question of history or the like. Therefore, in order to improve the performance of searching the FAQ information D11, it is desired to reflect a result corresponding to the reception in the FAQ database D1 by the operator OP or the like.

In the first embodiment, an example in which the information processing server 20 supports construction and maintenance of the FAQ database D1 on the basis of a question sentence of the user and a history of answer sentences to the question sentence will be described. In the present embodiment, the construction of the FAQ database D1 includes adding the FAQ information D11 and associating at least one of new question example information D12 and tag information D13 with the existing FAQ information D11. Furthermore, the maintenance of the FAQ database D1 includes changing or deleting at least one of the existing FAQ information D11, question example information D12, and tag information D13.

The FAQ database D1 is a database that manages typical representative question sentences in a question-and-answer format. The FAQ database D1 includes the FAQ information D11, the question example information D12, and the tag information D13. In the present embodiment, a case where the question example information D12 and the tag information D13 are associated with the FAQ information D11 will be described, but at least one of the question example information D12 and the tag information D13 may be associated with the FAQ information D11.

The FAQ information D11 is an example of first information. The FAQ information D11 includes, for example, information indicating a representative question sentence and an answer sentence to the representative question sentence. The representative question sentence is information indicating a question sentence from the user assumed in advance. The answer sentence is information indicating an answer to the representative question sentence. In the present embodiment, one piece of FAQ information D11 is provided with respect to one representative question sentence.

The question example information D12 is an example of third information. The question example information D12 is, for example, information indicating a question example similar to the representative question sentence of the FAQ information D11. The question example information D12 is associated with the FAQ information D11 having a similar representative question sentence. The question example information D12 may have a plurality of question sentences associated with one piece of FAQ information D11.

For example, it is assumed that the representative question sentence of the FAQ information D11 is "The compact disc (CD) or the digital versatile disc (DVD) cannot be taken out from a personal computer". In this case, the question example information D12 associated with the FAQ information D11 includes, for example, question examples such as "CD does not come out", "DVD cannot be ejected", "CD cannot be come out", "DVD does not come out", and "The disc cannot be taken out".

The tag information D13 is an example of fourth information. The tag information D13 is information appropriately indicative of the content of the FAQ information D11. The tag information D13 is information set for searching the FAQ information D11. The tag information D13 is information indicating conditions such as the state of the user, the electronic device to be questioned, and the state of the electronic device. The tag information D13 is unique information in the FAQ database D1 and can be associated with a plurality of pieces of FAQ information D11.

Note that, in the first embodiment, a case where the FAQ database D1 associates the question example information D12 and the tag information D13 with the FAQ information D11 will be described, but it is not limited thereto. For example, the FAQ database D1 may be configured to associate only one of the question example information D12 and the tag information D13 with the FAQ information D11. Furthermore, the FAQ database D1 may be configured not to associate the question example information D12 and the tag information D13 with the FAQ information D11. In other words, the FAQ database D1 may be configured to store only the FAQ information D11.

The history database D2 is a database that manages the history of reception to the user. The history database D2 includes one or a plurality of pieces of history information D20. The history information D20 is an example of second information. The history information D20 is, for example, information corresponding to one reception on a one-to-one basis. The history information D20 includes the inquiry information D21 and the answer information D22. The inquiry information D21 and the answer information D22 are, for example, information indicating natural language, voice, and the like. In the present embodiment, the history information D20 stores pairs of the inquiry information D21 and the answer information D22 in time series, so that it is possible to determine a change in the question sentence or the answer sentence.

The inquiry information D21 includes, for example, information indicating at least one of a question sentence and a tag. The question sentence is information indicating an actual question sentence from the user. The tag includes a question from the user, information for classifying a keyword, a model, and the like, information indicating a tag specified by the user, and the like. The answer information D22 includes, for example, information indicating an answer sentence. The answer information D22 includes, for example, information indicating a reception to an actual question from the user. The reception includes, for example, an action in which the operator OP or the like creates an answer sentence based on an existing business document. The business document includes, for example, information indicating a reception manual, terms and conditions, an FAQ, and the like. The reception includes, for example, an action in which the information processing server 20 provides information to the user. The answer information D22 may include, for example, reference information indicating a business document referred to by the operator OP, a link to information referred to by the operator OP, and the like.

For example, upon receiving a support request from the information processing terminal 10, the information processing server 20 creates support information D100 on the basis of at least one of the inquiry information D21 and the answer information D22 stored in the history database D2, and causes the information processing terminal 10 to display the support information D100. The support information D100 is, for example, information for supporting at least one of construction and maintenance of the FAQ database D1. The support information D100 includes, for example, an object, an input screen, and the like that support the operator OP to input, select, and the like various types of information.

As a result, the information processing terminal 10 supports at least one of construction and maintenance of the FAQ database D1 by displaying the support information D100 to the operator OP. Then, the operator OP considers and determines construction and maintenance of the FAQ information D11 by referring to the support information D100, and performs input with respect to the support information D100. The information processing terminal 10 transmits input information D200 input by the operator OP to the information processing server 20.

The information processing server 20 executes processing of at least one of construction and maintenance of the FAQ database D1 on the basis of the support information D100. For example, the information processing server 20 executes processing of adding new FAQ information D11 to the FAQ database D1 or changing existing FAQ information D11. For example, the information processing server 20 executes processing of changing or deleting at least one of the question example information D12 and the tag information D13 associated with the FAQ information D11. For example, the information processing server 20 executes processing of adding at least one of the question example information D12 and the tag information D13 to the FAQ information D11. As a result, the information processing apparatus 1S can cause the operator OP to input the input information D200 for constructing and maintaining the FAQ database D1 by creating the support information D100 based on the history of reception with the information processing server 20. Therefore, the information processing apparatus 1S can suppress the burden on the operator OP who constructs and maintains the representative question and the answer sentence on the basis of the history of reception with respect to the user. Furthermore, the information processing apparatus 1S can support the operator OP to extract valid information for improving the search accuracy of the FAQ database D1 according to the support information D100.

Figure 2:
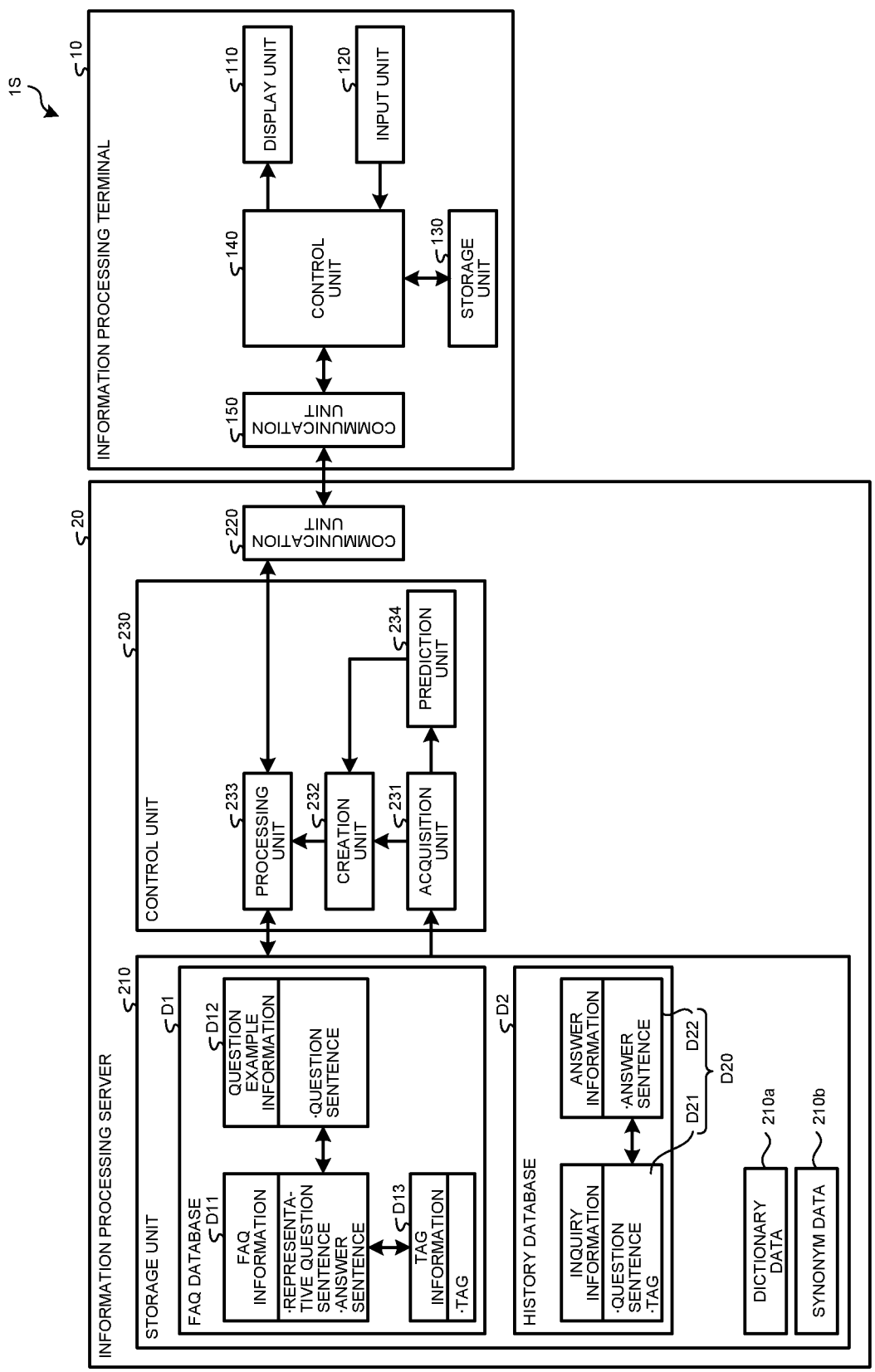
FIG. 2 is a diagram illustrating a configuration example of an information processing apparatus according to the first embodiment.

Configuration Example of the Information Processing Apparatus According to the First Embodiment Next, an example of a configuration of the information processing apparatus 1S according to the first embodiment will be described. FIG. 2 is a diagram illustrating a configuration example of the information processing apparatus 1S according to the first embodiment.

As illustrated in FIG. 2, the information processing apparatus 1S includes the information processing terminal 10 and the information processing server 20. Note that the information processing apparatus 1S is not limited to the configuration of the information processing apparatus 1S according to the present disclosure. For example, the information processing apparatus 1S may implement various functions of the information processing terminal 10 and the information processing server 20 with one dedicated computer, electronic device, or the like.

{Information Processing Terminal 10}

Next, an example of a functional configuration of the information processing terminal 10 according to the first embodiment will be described. As illustrated in FIG. 2, the information processing terminal 10 includes a display unit 110, an input unit 120, a storage unit 130, a control unit 140, and a communication unit 150. The control unit 140 is electrically connected to the display unit 110, the input unit 120, the storage unit 130, and the communication unit 150.

The display unit 110 has a function of displaying various types of information on the display unit 110. The display unit 110 displays, for example, the support information D100 and the like received from the information processing server 20. The display unit 110 is controlled by the control unit 140.

In the present embodiment, the display unit 110 includes, for example, a display device that displays various types of information. Examples of the display device include a liquid crystal display (LCD) apparatus, an organic light emitting diode (OLED) apparatus, a touch panel, and the like. Furthermore, the display unit 110 according to the present embodiment may output support information or the like by a projection function.

The input unit 120 includes an input apparatus for the operator OP to perform input and selection. The input apparatus includes, for example, a keyboard, a mouse, and the like. The input unit 120 may include, for example, a microphone for collecting the voice of the operator OP. The input unit 120 outputs the input information to the control unit 140.

The storage unit 130 stores various data and programs. For example, the storage unit 130 is, for example, a semiconductor memory element such as a RAM or a flash memory, a hard disk, an optical disk, or the like. The storage unit 130 stores an application program and the like for supporting the operator OP. Note that the storage unit 130 may be provided in a cloud server or the like connected to the information processing terminal 10 via a network.

The control unit 140 has a function of controlling each configuration included in the information processing terminal 10. The control unit 140 controls, for example, activation and stop of each configuration. Furthermore, the control unit 140 causes the display unit 110 to output various types of information generated by the information processing server 20. The control unit 140 provides the information input from the input unit 120 to the information processing server 20. The control unit 140 has a function of executing processing requested from the information processing server 20. The control unit 140 supports the operator OP by executing the processing.

The communication unit 150 has a function of performing information communication with the information processing server 20 via a network. Specifically, the communication unit 150 transmits the information input by the input unit 120 to the information processing server 20 as the input information D200. Furthermore, upon receiving information such as the support information D100 from the information processing server 20, the communication unit 150 outputs the information to the control unit 140.

The functional configuration example of the information processing terminal 10 according to the present embodiment has been described above. Note that the configuration described above with reference to FIG. 2 is merely an example, and the functional configuration of the information processing terminal 10 according to the present embodiment is not limited to such an example. The functional configuration of the information processing terminal 10 according to the present embodiment can be flexibly modified according to specifications and operations.

{Information Processing Server 20}

Next, an example of a configuration of the information processing server 20 will be described. As illustrated in FIG. 2, the information processing server 20 includes a storage unit 210, a communication unit 220, and a control unit 230. The control unit 230 is electrically connected to the storage unit 210 and the communication unit 220.

The storage unit 210 is realized by, for example, a semiconductor memory element such as a RAM or a flash memory, or a storage apparatus such as a hard disk or an optical disk. The storage unit 210 stores various types of information such as dictionary data 210a and synonym data 210b. The dictionary data 210a is, for example, a dictionary of words constituting a document. The synonym data 210b includes, for example, data indicating a table, a program, and the like for extending the words of the question sentence of the user to the synonyms. In the present embodiment, the storage unit 210 stores information such as the FAQ database D1 and the history database D2 described above, but is not limited thereto. For example, at least one of the FAQ database D1 and the history database D2 may be stored in an external storage apparatus or the like accessible by the information processing server 20.

The communication unit 220 has a function of performing information communication with the information processing terminal 10 via a network. Specifically, the communication unit 220 transmits information such as the support information D100 from a processing unit 233 to the information processing terminal 10. Furthermore, upon receiving information such as the input information D200 from the information processing terminal 10, the communication unit 220 outputs the information to the control unit 230.

The control unit 230 controls the operation of the information processing server 20. The control unit 230 includes an acquisition unit 231, a creation unit 232, the processing unit 233, and a prediction unit 234. Each functional unit of the acquisition unit 231, the creation unit 232, the processing unit 233, and the prediction unit 234 is realized by, for example, a CPU, an MPU, or the like executing a program using a RAM or the like as a work area. Furthermore, each functional unit may be realized by, for example, an integrated circuit such as an ASIC or an FPGA.

The acquisition unit 231 acquires history information (second information) D20 indicating the history of reception with respect to the user from the history database D2 of the storage unit 210. For example, the acquisition unit 231 acquires the history information D20 stored in the history database D2 at a predetermined timing. The predetermined timing includes, for example, a timing at which a request for support is received from the information processing terminal 10, a predetermined time, date and time, and the like. The acquisition unit 231 outputs the acquired history information D20 to the creation unit 232. Note that when the history information D20 is acquired, the acquisition unit 231 may delete the history information D20 from the history database D2. Furthermore, the acquisition unit 231 may be incorporated in the creation unit 232.

The creation unit 232 creates the support information D100 for supporting at least one of construction and maintenance of the FAQ database D1 on the basis of the FAQ information (first information) D11 stored in the FAQ database D1 and the history information D20 stored in the storage unit 210. For example, on the basis of the FAQ information D11 and the history information D20, the creation unit 232 creates the support information D100 for changing or adding at least one of the FAQ information D11, the question example information D12, and the tag information D13. Note that a method of creating the support information D100 will be described later. The creation unit 232 outputs the created support information D100 to the processing unit 233.

The processing unit 233 executes processing of at least one of construction and maintenance of the FAQ database D1 on the basis of the input information D200 input to the support information D100 created by the creation unit 232. For example, the processing unit 233 executes processing for controlling display of the support information D100 on the information processing terminal 10 via the communication unit 220. For example, the processing unit 233 executes processing of constructing and maintaining the FAQ database D1 on the basis of the input information D200 input to the displayed support information D100. In other words, the processing unit 233 executes processing of adding or deleting the FAQ information D11 with respect to the FAQ database D1 or changing the FAQ information D11 of the FAQ database D1.

The prediction unit 234 has a function of predicting the likelihood of reception of new FAQ information D11 with respect to the user when the new FAQ information D11 based on the history information D20 is constructed in the FAQ database D1. A prediction method by the prediction unit 234 will be described later. The prediction unit 234 outputs the predicted prediction result to the creation unit 232. Then, the creation unit 232 creates the support information D100 in which the prediction result of the prediction unit 234 is associated with the new FAQ information D11.

The functional configuration example of the information processing server 20 according to the present embodiment has been described above. Note that the configuration described above with reference to FIG. 2 is merely an example, and the functional configuration of the information processing server 20 according to the present embodiment is not limited to such an example. The functional configuration of the information processing server 20 according to the present embodiment can be flexibly modified according to specifications and operations.

[Procedure of Information Processing Related to Creation Support of FAQ Information]

Figure 3:
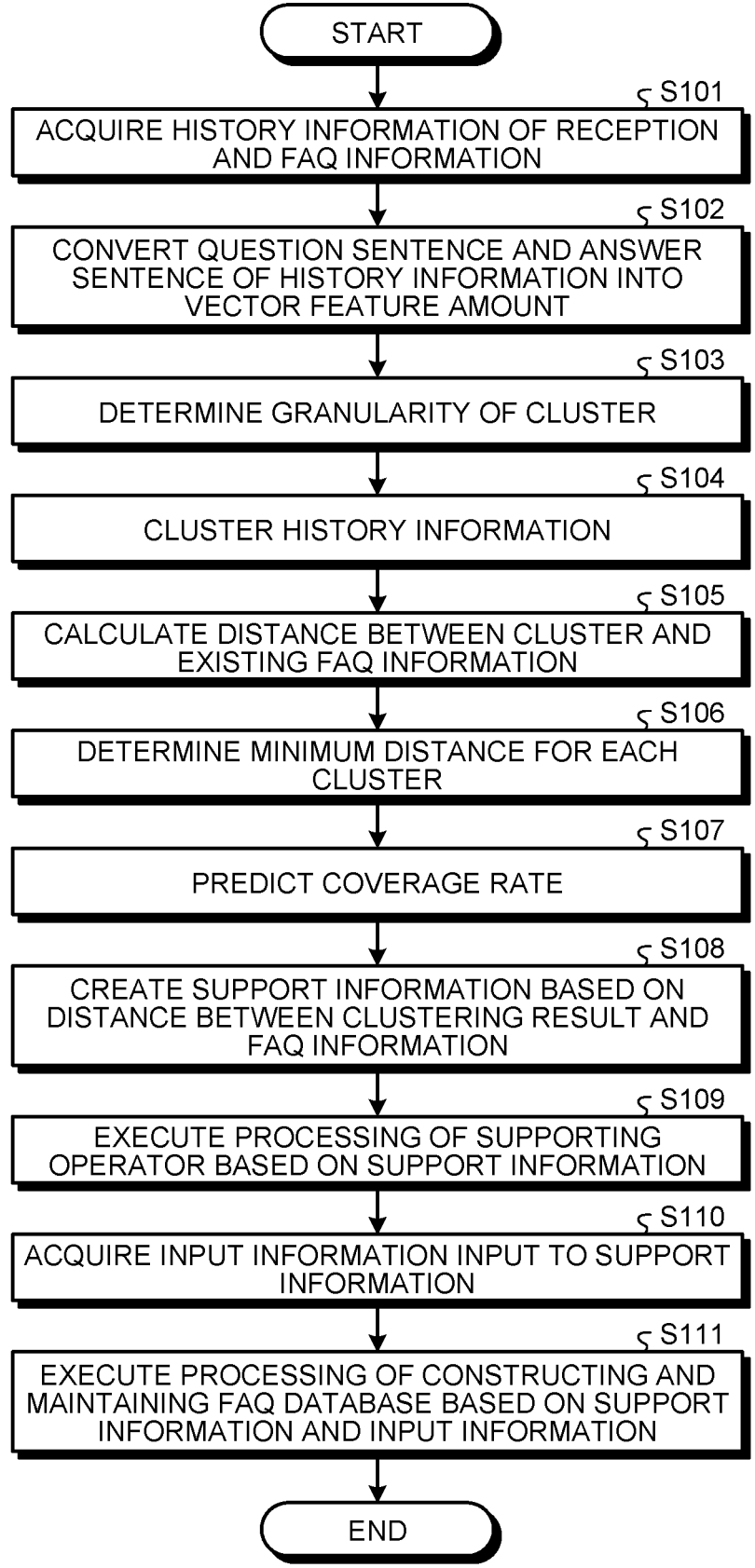
FIG. 3 is a flowchart illustrating an example of a procedure of information processing related to creation support of FAQ information.
Figure 4:
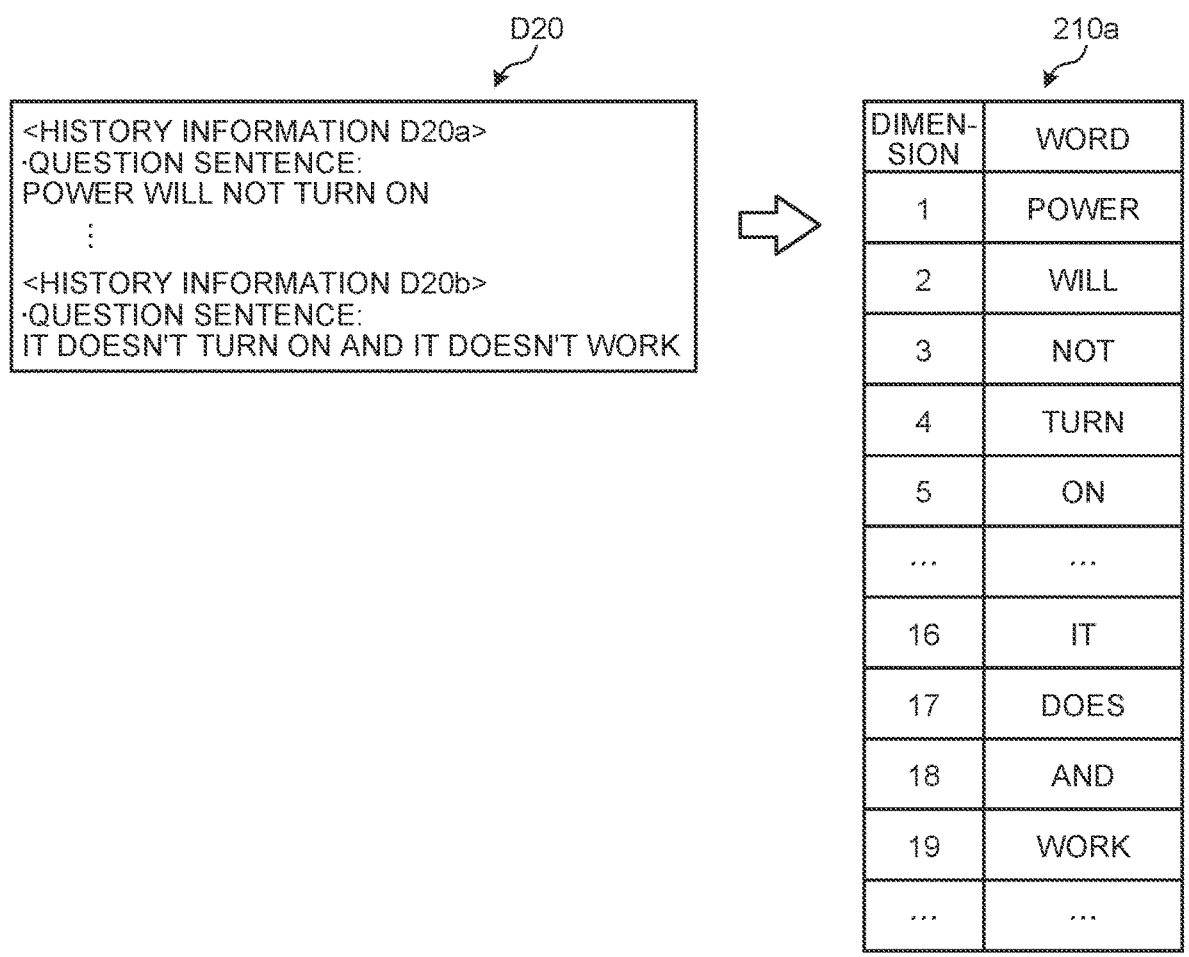
FIG. 4 is a diagram illustrating an example of a question sentence of history information and dictionary data.

Next, with reference to FIGS. 3 to 6, a procedure of information processing related to creation support of the FAQ information D11 will be described. FIG. 3 is a flowchart illustrating an example of a procedure of information processing related to creation support of the FAQ information D11. FIG. 4 is a diagram illustrating an example of a question sentence of the history information D20 and the dictionary data 210a. The processing procedure illustrated in FIG. 3 is realized by the control unit 230 of the information processing server 20 executing a program.

As illustrated in FIG. 3, the information processing server 20 acquires the history information D20 of reception, and the FAQ information D11 (step S101). For example, the information processing server 20 acquires the history information D20 stored in the history database D2. For example, the information processing server 20 may acquire all pieces of the FAQ information D11 stored in the FAQ database D1, or may acquire only the FAQ information D11 related to support.

The information processing server 20 converts the question sentence and the answer sentence of the history information D20 into vector feature amounts (step S102). For example, the history information D20 in the history database D2 includes information of a question sentence and an answer sentence at the time of reception by the operator OP. The information processing server 20 converts the question sentence and the answer sentence into a feature amount vector by an existing technology such as a morphological analysis algorithm, term frequency-inverse document frequency (TF-IDF), or Word2Vec, and obtains a distance (similarity) between the sentences or an average vector.

For example, as illustrated in FIG. 4, a sentence "Power will not turn on" is set to the question sentence of first history information D20a. In the question sentence of second history information D20b, a sentence "It doesn't turn on and it does not work" is set. In this case, the information processing server 20 performs morphological analysis of the sentences. For example, the question sentence of the first history information D20a is analyzed "power/will/not/turn/on". The question sentence of the second history information D20b is analyzed as "it/does/not/turn/on/and/it/does/not/work". As a result, the information processing server 20 stores the dictionary data 210a illustrated in FIG. 4 in the storage unit 210. The dictionary data 210a is data that associates dimensions with words. For example, in a case where the dimension is 1, the word of the dictionary data 210a is "power", and in a case where the dimension is 2, the word is "will". Thus, "Power will not turn on" can be indicated by "1, 2, 3, 4, 5", and "It doesn't turn on and it does not work" can be indicated by "16, 17, 3, 4, 5, 18, 16, 17, 3, 19". Then, the information processing server 20 performs sparse vector expression. Thus, "Power will not turn on" becomes "1:1, 2:1, 3:1, 4:1, 5:1" when expressed by dimension: the number of times. Similarly, "It doesn't turn on and it does not work" is "3:2, 4:1, 5:1, 16:2, 17:2, 18:1, 19:1". Then, the information processing server 20 normalizes the vector such that the length becomes 1. Specifically, the information processing server 20 obtains a unit vector for each dimension and normalizes the sentence by dividing the number of times by the obtained unit vector. For example, the "dimension: element value" of the normalization of "It doesn't turn on and it does not work" is "3:0.5, 4:0.25, 5:0.25, 16:0.5, 17:0.5, 18:0.25, 19:0.25". Then, the information processing server 20 calculates the average of the sentences and the distance between the sentences. For example, the information processing server 20 calculates the average of the sentences by adding the vector of the sentences and dividing by the number of sentences. For example, the information processing server 20 calculates the distance between the sentences by squaring the difference between the vectors of the sentences and taking the square root.

The information processing server 20 determines the granularity of clusters (step S103). For example, when clustering is performed, it is generally necessary to specify the number of clusters or a threshold value of a distance for forming the same cluster. On the other hand, the information processing server 20 uses the existing FAQ information D11 to determine a threshold value of a distance between question sentences of the question example information D12 associated with the FAQ information D11, or determine the number of clusters larger by 1 to 2 than the number of pieces of existing FAQ information D11, thereby determining the granularity of clusters. The number of pieces of existing FAQ information D11 means the number of pieces of FAQ information D11 originally existing in the FAQ database D1. In the present embodiment, for example, the information processing server 20 assumes at most 1 to 2 pieces of FAQ information D11, and determines the number of clusters larger by 1 to 2 than the number of pieces of existing FAQ information D11.

The information processing server 20 clusters the history information D20 (step S104). For example, the information processing server 20 forms a cluster in which similar history information D20 belong to the same cluster by using a general clustering algorithm. The clustering algorithm includes, for example, a known K-means method, density-based spatial clustering of applications with noise (DBSCAN), and the like. The clustering algorithm includes, for example, an algorithm in which the minimum value of the distance is used as a parameter, and those farther than the distance are set as another cluster. The clustering algorithm includes, for example, an algorithm that creates a cluster so that the number of clusters is reached using the number of clusters as a parameter. Then, the information processing server 20 clusters the question sentences and the answer sentences of the history information D20 by executing step S104.

The information processing server 20 calculates a distance between the cluster and the existing FAQ information D11 (step S105). For example, the information processing server 20 calculates a distance between the history information D20 existing in the cluster and the existing FAQ information D11. Then, the information processing server 20 determines the minimum distance for each cluster on the basis of the calculated distance (step S106).

The information processing server 20 predicts the coverage rate (step S107). For example, it is expected to increase the coverage rate with respect to a new question sentence by creating the FAQ information D11 for a cluster for which a question is frequently asked. Therefore, regarding the distance (minimum value), the information processing server 20 regards question sentences separated by the set threshold value or more as question sentences that cannot be covered by the existing FAQ information D11, and in a case where the FAQ information D11 is created for the question sentences, calculates, as a coverage rate, a likelihood of how many question sentences can be covered. For example, the information processing server 20 calculates the coverage rate before addition of the FAQ information D11 from (the number of questions belonging to a cluster whose distance is equal to or less than a threshold value/the total number of questions in the history information D20). For example, the information processing server 20 calculates the likelihood coverage rate by a cluster (group) to be added from (the number of questions belonging to each cluster whose distance is equal to or greater than a threshold value/the total number of questions in the history information D20). The information processing server 20 predicts the coverage rate by calculating a difference between the coverage rate before addition of the FAQ information D11 and the likelihood coverage rate by the group to be added.

The information processing server 20 creates the support information D100 on the basis of the distance between the clustering result and the FAQ information D11 (step S108). For example, a cluster generated by clustering can be a candidate for the new FAQ information D11, but in a case where the FAQ information D11 already exists, it is not necessary to newly create the FAQ information D11. Therefore, it is desirable to perform rearrangement in the order in which it is considered necessary to create the FAQ information D11, that is, in the order of clusters that do not exist in the existing FAQ information D11. For example, the information processing server 20 refers to the minimum value of the distance for each existing FAQ information D11 for each cluster with respect to the distance between the "average vector of representative question sentences for each existing FAQ information D11" and the "average vector of question sentences for each created cluster", and creates the support information D100 sorted in order from the cluster with the larger minimum value. Furthermore, for example, the information processing server 20 may create the support information D100 in which clusters are rearranged in the order of coverage rate.

Figure 5:
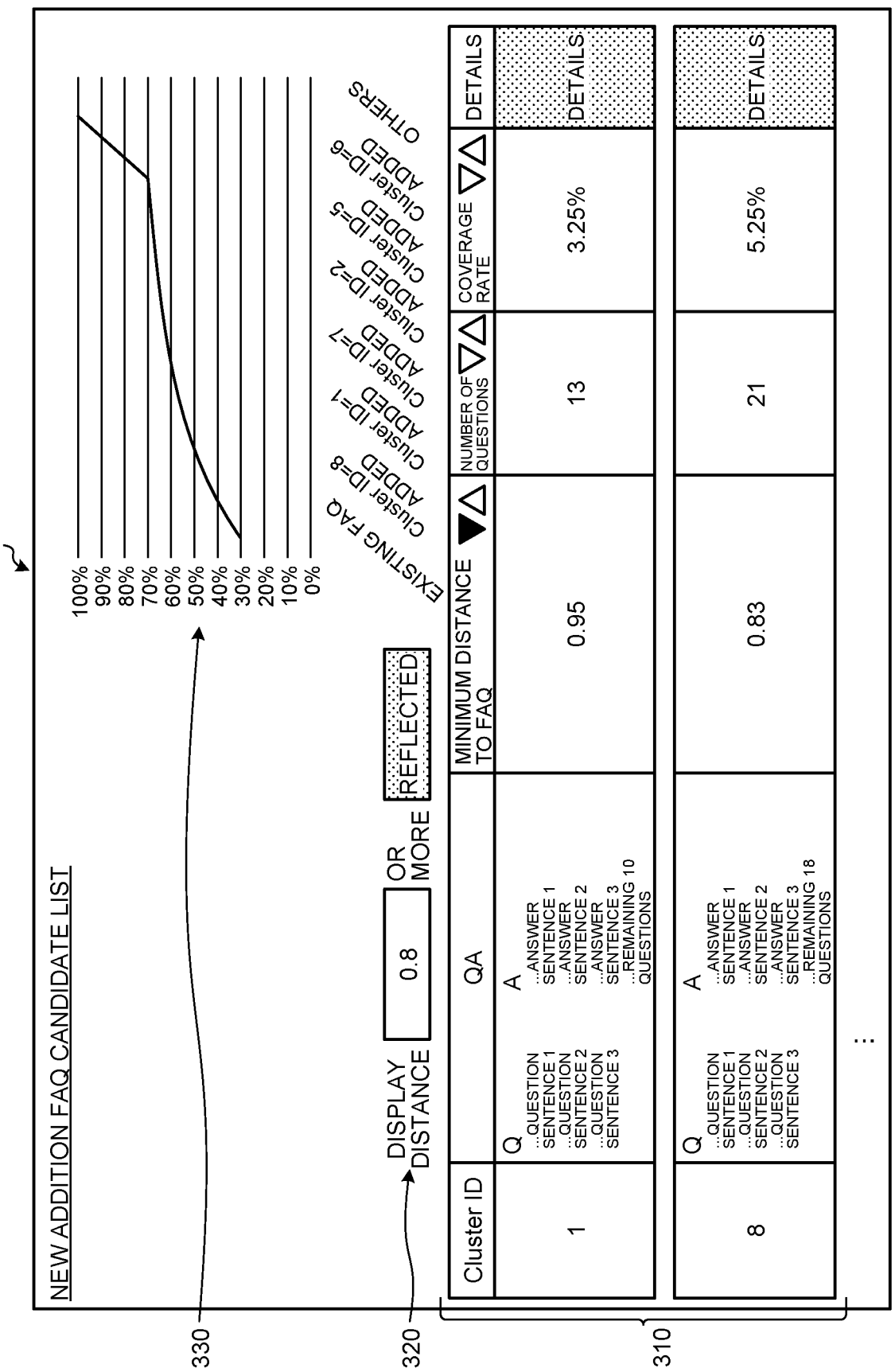
FIG. 5 is a diagram illustrating an example of support information related to creation support of FAQ information.

FIG. 5 is a diagram illustrating an example of the support information D100 related to creation support of the FAQ information D11. As illustrated in FIG. 5, the support information D100 indicates a new addition FAQ candidate list. The support information D100 includes cluster information 310, setting information 320, and likelihood information 330. The cluster information 310 includes items of Cluster ID, QA, minimum distance, the number of questions, coverage rate, and details. The Cluster ID is cluster identification information. The QA is a question sentence and an answer sentence for each cluster extracted from the history information D20. The minimum distance is the minimum distance between the question sentence of the cluster and the existing FAQ information D11. The minimum distance means that the closer the value is, the more the existing FAQ information D11 can cover. Furthermore, the minimum value means that the larger the value, the more desirably the question sentence and the answer sentence are newly added. The number of questions is the number of question sentences included in the cluster. The coverage rate is the coverage rate of the cluster. The details are information for displaying detailed information corresponding to the cluster.

The setting information 320 includes information for setting the minimum distance of the cluster information 310 to be displayed in a candidate list. In other words, the setting information 320 is information for hiding the cluster information 310 in which the history information D20 is similar to the existing FAQ information D11. In the example illustrated in FIG. 5, the setting information 320 is set to display the cluster information 310 having a distance of 0.8 or more and not to display the cluster information 310 having a distance of 0.8 or less. Then, the support information D100 is a candidate list in which the cluster information 310 having a distance of 0.8 or more is arranged in descending order. In the present embodiment, in the setting information 320, buttons for setting the display mode of the cluster information 310 in descending order or ascending order are associated with the minimum distance, the number of questions, and the coverage rate.

The likelihood information 330 includes information indicating a relationship between the likelihood of the existing FAQ information D11 and the likelihood when the cluster information 310 is added. In the example illustrated in FIG. 5, the likelihood information 330 indicates the likelihood for each of the existing FAQ information D11 and the cluster information 310 in a graph such that the likelihood values are in ascending order. As a result, the operator OP can compare the likelihood of the existing FAQ information D11 with the likelihood in a case where the cluster information 310 is added by referring to the likelihood information 330.

In the example illustrated in FIG. 5, the support information D100 is information for displaying a list in which the cluster information 310 is arranged such that the minimum distance is in descending order. The support information D100 is configured to display the likelihood information 330 at an upper right of the cluster information 310, but is not limited thereto. When the Cluster ID is "1", the support information D100 displays 3 question sentences and answer sentences out of 13 question sentence and answer sentence pairs as QA, and does not display the other question sentences and answer sentences, but may display all the 13 pairs.

Figure 6:
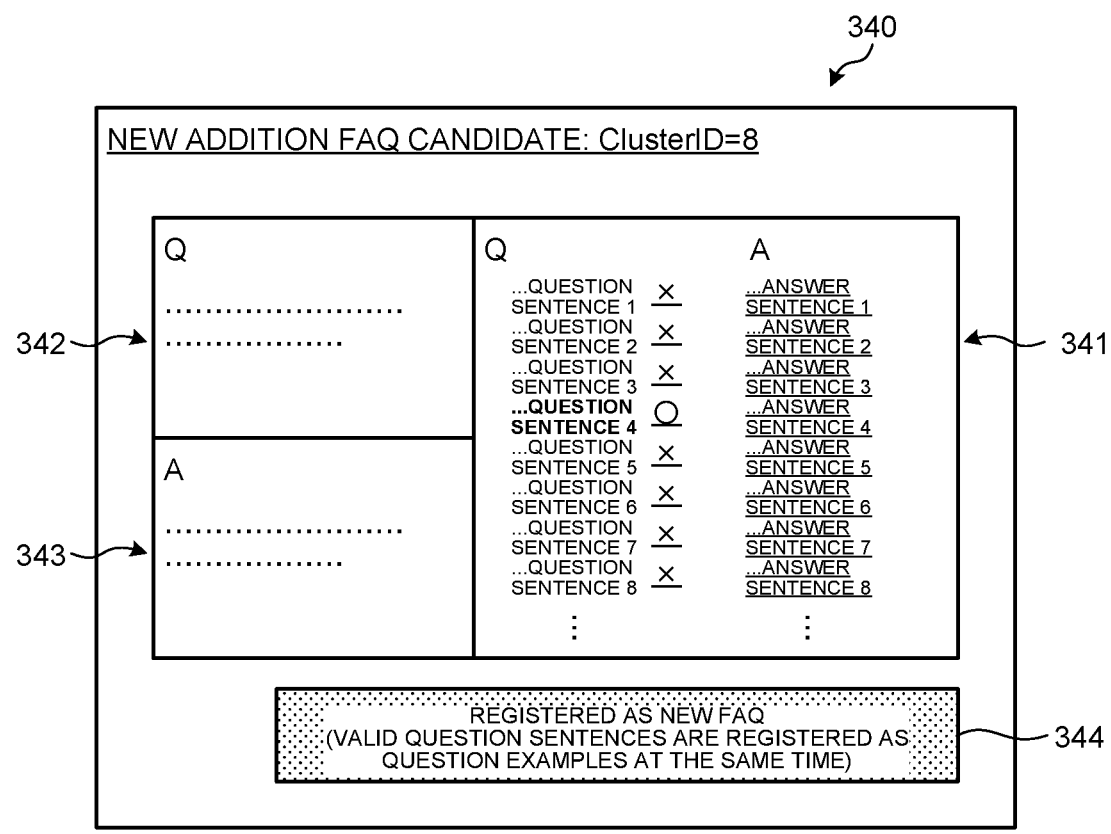
FIG. 6 is a diagram illustrating an example of detailed information included in support information.

FIG. 6 is a diagram illustrating an example of detailed information 340 included in the support information D100. As illustrated in FIG. 6, the support information D100 further includes the detailed information 340. The detailed information 340 is information presented when the details of the cluster information 310 are selected by the operator OP. The detailed information 340 includes list information 341, question candidate information 342, answer candidate information 343, and a registration button 344. In the example illustrated in FIG. 6, the detailed information 340 indicates information in a case where the Cluster ID of the cluster information 310 illustrated in FIG. 5 is "8". The list information 341 is information indicating a list of question sentences and answer sentences in QA of the cluster information 310. The list information 341 may be configured to display the list in a scrollable manner. The question candidate information 342 is information indicating a question sentence selected in the list information 341 as a candidate to be newly added. The answer candidate information 343 is information indicating an answer sentence corresponding to the question sentence of the question candidate information 342. The registration button 344 is a button for requesting registration of the question candidate information 342 and the answer candidate information 343 as new FAQ information D11. In the present embodiment, the information processing server 20 executes processing for registering the new FAQ information D11 and registering the question sentence of the list information 341 as the question example information D12 associated with the new FAQ information D11 in response to selection of the registration button 344.

In the example illustrated in FIG. 6, the support information D100 is information for displaying question sentences and answer sentences of the list information 341 in a selectable manner for the detailed information 340.

Specifically, the support information D100 is information for displaying a list of question sentences and answer sentences as the list information 341 and displaying details of one question sentence and answer sentence among the list in the question candidate information 342 and the answer candidate information 343. In the example illustrated in FIG. 6, "Question Sentence 1" of the list information 341 is selected, and "Question Sentence 1" and its "Answer Sentence 1" are displayed in the question candidate information 342 and the answer candidate information 343. In this state, for example, when "Question Sentence 2" is selected by the operator OP or the like, the support information D100 includes information for displaying "Question Sentence 2" and its "Answer Sentence 2" in the question candidate information 342 and the answer candidate information 343. In other words, the support information D100 includes information for displaying "Question Sentence 2" and its "Answer Sentence 2" in the question candidate information 342 and the answer candidate information 343. Furthermore, the support information D100 includes information for displaying "o" or "x" in the question sentence of the list information 341. The support information D100 includes information for shifting the corresponding question sentence from the valid state to the invalid state when "x" in the list information 341 is selected. The support information D100 includes information for shifting the corresponding question sentence from the invalid state to the valid state when "o" in the list information 341 is selected. In the example illustrated in FIG. 6, in the detailed information 340, Question Sentence 4 of the list information 341 is in an invalid state, and the other question sentences are in a valid state. In the present embodiment, by displaying "o" and "x" in the list information 341 of the support information D100, when the registration button 344 of the detailed information 340 is selected, it is possible to register only a question sentence in the valid state among the list as a question example.

Returning to FIG. 3, the information processing server 20 executes processing of supporting the operator OP on the basis of the support information D100 (step S109). For example, the information processing server 20 transmits the support information D100 to the information processing terminal 10 via the communication unit 220, and causes the display unit 110 of the information processing terminal 10 to display the support information D100. Then, the information processing server 20 acquires the input information D200 input to the support information D100 (step S110). For example, in a case where the support information D100 illustrated in FIG. 5 is displayed on the information processing terminal 10, when the details of the cluster information 310 are selected, the information processing server 20 causes the display unit 110 of the information processing terminal 10 to display the detailed information 340 illustrated in FIG. 6. Then, when the registration button 144 of the detailed information 340 is selected, the information processing server 20 acquires information indicating the question sentence and the answer sentence of the question candidate information 342 and the answer candidate information 343 of the detailed information 340 as the input information D200. Furthermore, the information processing server 20 determines the validity of the question sentence of the list information 141 of the detailed information 340, and acquires the valid question sentence as the input information D200. The validity of the question sentence is determined based on, for example, the calculated distance coverage rate and the preset threshold value.

The information processing server 20 executes processing of constructing and maintaining the FAQ database D1 on the basis of the support information D100 and the input information D200 (step S111). For example, the information processing server 20 executes processing of creating the FAQ information D11 to be newly added on the basis of the input information D200 and adding the FAQ information D11 to the FAQ database D1. Furthermore, in a case where the input information D200 includes a question example, the information processing server 20 creates question example information D12 indicating the question example. Then, the information processing server 20 executes processing for adding and correcting the question example information D12 with respect to the FAQ database D1 so as to be associated with the newly added FAQ information D11. As a result, the new FAQ information D11 is added to the FAQ database D1, and the question example information D12 is associated with the FAQ information D11. When the processing of step S111 ends, the information processing server 20 ends the processing procedure illustrated in FIG. 3.

In the example of the processing procedure illustrated in FIG. 3, the information processing server 20 functions as the acquisition unit 231 described above by executing the processing of step S101. Then, the information processing server 20 functions as the creation unit 232 described above by executing the processing from steps S102 to S106 and S108. Then, the information processing server 20 functions as the processing unit 233 described above by executing the processing from steps S109 to S111. Then, the information processing server 20 functions as the prediction unit 234 described above by executing the processing of step S107.

As described above, the information processing apparatus 1S according to the present embodiment creates the support information D100 on the basis of the distance between the result of clustering at least one of the question sentence (second question) from the user indicated by the history information D20 and the actual answer sentence (second answer) to the question sentence and the FAQ information D11 by the creation unit 232. Thus, the information processing apparatus 1S can support construction and maintenance of the FAQ database D1 on the basis of the distance between the result of clustering the history of reception and the FAQ information D11. As a result, the information processing apparatus 1S can improve the search accuracy of the FAQ information D11 by reflecting the actual question sentence and answer sentence of the reception in the FAQ database D1.

Furthermore, the information processing apparatus 1S creates the support information D100 for supporting construction of new FAQ information D11 based on the history information D20 in the FAQ database D1 by the creation unit 232 on the basis of the distance between the result of clustering and the FAQ information D11. Thus, the information processing apparatus 1S can support construction of new FAQ information D11 based on the history information in the FAQ database D1 on the basis of the distance between the result of clustering of the history information D20 of the reception and the FAQ information D11. As a result, the information processing apparatus 1S can suppress the work load of the operator OP and improve the search accuracy of the FAQ information D11 by supporting the determination of the operator OP who adds the history information D20 of the reception to the FAQ database D1.

Furthermore, the information processing apparatus 1S creates the support information D100 for displaying the plurality of pieces of history information D20 in a selectable manner in an order according to the distance between each of the plurality of pieces of history information D20 and the FAQ information D11 by the creation unit 232. Thus, the information processing apparatus 1S can support selection of the history information D20 to be reflected in the FAQ database D1 from among the plurality of pieces of history information D20 on the basis of the order of distance. As a result, the information processing apparatus 1S can improve work efficiency of construction and maintenance of the FAQ database D1 by the operator OP.

Furthermore, in a case where the history information D20 is constructed in the FAQ database D1 as the new FAQ information D11, the information processing apparatus 1S predicts the likelihood of reception of the FAQ information D11 with respect to the user by the prediction unit 234, and creates the support information D100 in which the prediction result is associated with the new FAQ information D11 by the creation unit 232. Thus, the information processing apparatus 1S can support the determination as to whether or not to register the history information D20 as the new FAQ information D11 by indicating the prediction result of the reception of the new FAQ information D11. As a result, the information processing apparatus 1S can improve work efficiency of constructing the history information D20 for improving the search accuracy of the FAQ information D11 in the FAQ database D1.

Furthermore, the information processing apparatus 1S determines the granularity of clustering on the basis of the distance of the existing FAQ information D11 stored in the FAQ database D1 by the creation unit 232. Thus, the information processing apparatus 1S determines the threshold value of the distance between question sentences of the question example information D12 associated with the FAQ information D11 using the existing FAQ information D11. The information processing apparatus 1S determines the number of clusters larger than the number of pieces of existing FAQ information D11. As a result, the information processing apparatus 1S can eliminate the work of causing the operator OP to specify the number of clusters, the threshold value of the distance for forming the same cluster, or the like, and thus can suppress the work load of the operator OP.

Furthermore, the information processing apparatus 1S creates the support information D100 for proposing a question sentence (second question) obtained by clustering the history information D20 to the operator OP as question example information (third information) D12 indicating a question example associated with the FAQ information D11 by the creation unit 232. Thus, the information processing apparatus 1S can simultaneously propose addition of the FAQ information D11 and addition of the question example information D12 associated with the FAQ information D11. As a result, since the information processing apparatus 1S can simultaneously register the FAQ information D11 and the question example information D12, the work efficiency of the operator OP can be further improved.

The information processing server 20 described above may determine the threshold value of distance using the question sentence of the question example information D12 associated with the existing FAQ information D11. For example, when specifying the distance parameter, the information processing server 20 may use the minimum distance of the question example when dividing the FAQ information D11 as the parameter on the basis of the question example information D12 associated with the existing FAQ information D11. For example, in a case where two question examples are associated with different pieces of FAQ information D11, the information processing server 20 may obtain distances for all combinations of the question examples, perform sorting in the order of distance, and determine a distance in the bottom 10% of rankings as the threshold value. Note that the information processing server 20 can suppress the possibility that an extreme value is obtained when setting to the minimum value by using 10 percentile.

[Procedure of Information Processing Related to Correction Support of FAQ Information]

Next, with reference to FIGS. 7 to 9, a procedure of information processing related to correction support of the FAQ information D11 will be described. For example, in a case where existing FAQ information D11 close to a cluster exists, the information processing server 20 compares the answer sentence of the FAQ information D11 with the answer sentence of the history information D20, and supports correction of the answer sentence of the FAQ information D11 on the basis of the result.

Figure 7:
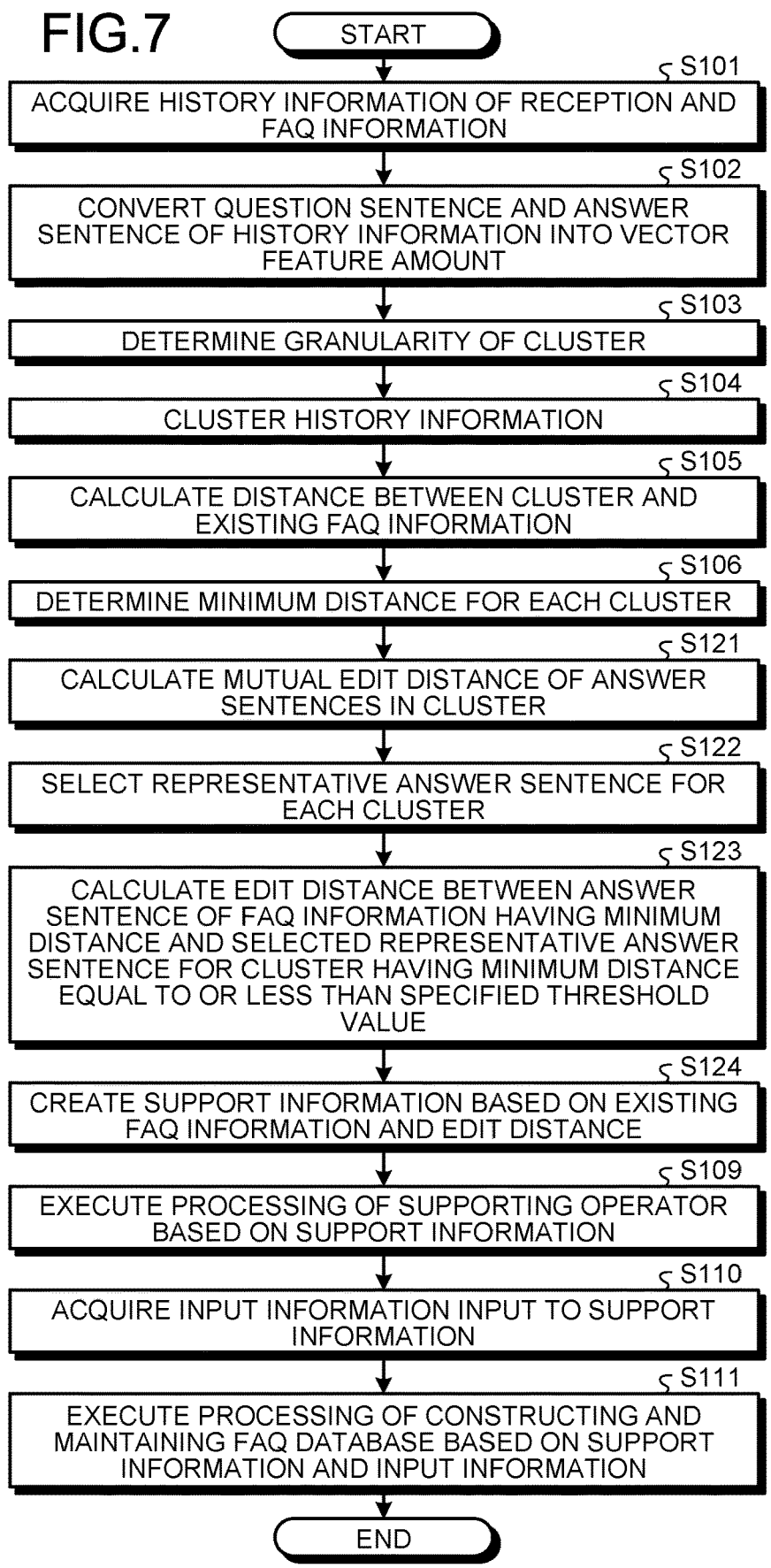
FIG. 7 is a flowchart illustrating an example of a procedure of information processing related to correction support of FAQ information.

FIG. 7 is a flowchart illustrating an example of a procedure of information processing related to correction support of the FAQ information D11. The processing procedure illustrated in FIG. 7 is realized by the control unit 230 of the information processing server 20 executing a program.

In the example illustrated in FIG. 7, steps S101 to S106 and S109 to S111 are the same as steps S101 to S106 and S109 to S111 illustrated in FIG. 3 that have already been described, and thus only different portions will be described and the description of the same portions will be omitted.

As illustrated in FIG. 7, when determining the minimum distance for each cluster in step S106, the information processing server 20 calculates a mutual edit distance of the answer sentences in the cluster (step S121). For example, as described above, the information processing server 20 calculates the edit distance of the answer sentence by squaring the difference between the vectors of the sentences of the answer sentences and taking the square root. Then, the information processing server 20 selects a representative answer sentence for each cluster (step S122). For example, in a case where a plurality of answer sentences exists in the cluster, the information processing server 20 selects the latest answer sentence, which is representative, on the basis of mutual edit distances. For example, in a case where there is one answer sentence in the cluster, the information processing server 20 selects the answer sentence.

The information processing server 20 calculates an edit distance between the answer sentence of the FAQ information D11 having the minimum distance and the selected representative answer sentence for the cluster having the minimum distance equal to or less than the specified threshold value (step S123). Then, the information processing server 20 creates the support information D100 on the basis of the existing FAQ information D11 and the calculated edit distance (step S124). For example, regarding a cluster having the minimum distance equal to or less than the specified threshold value, by presenting the operator OP with an edit distance between the answer sentence of the FAQ information D11 that is the minimum and the latest answer sentence in the cluster, it is possible to cause the operator OP to determine necessity to correct the answer sentence of the FAQ information D11. Therefore, the information processing server 20 creates the support information D100 that displays the clusters in the order of edit distance.

Figure 8:
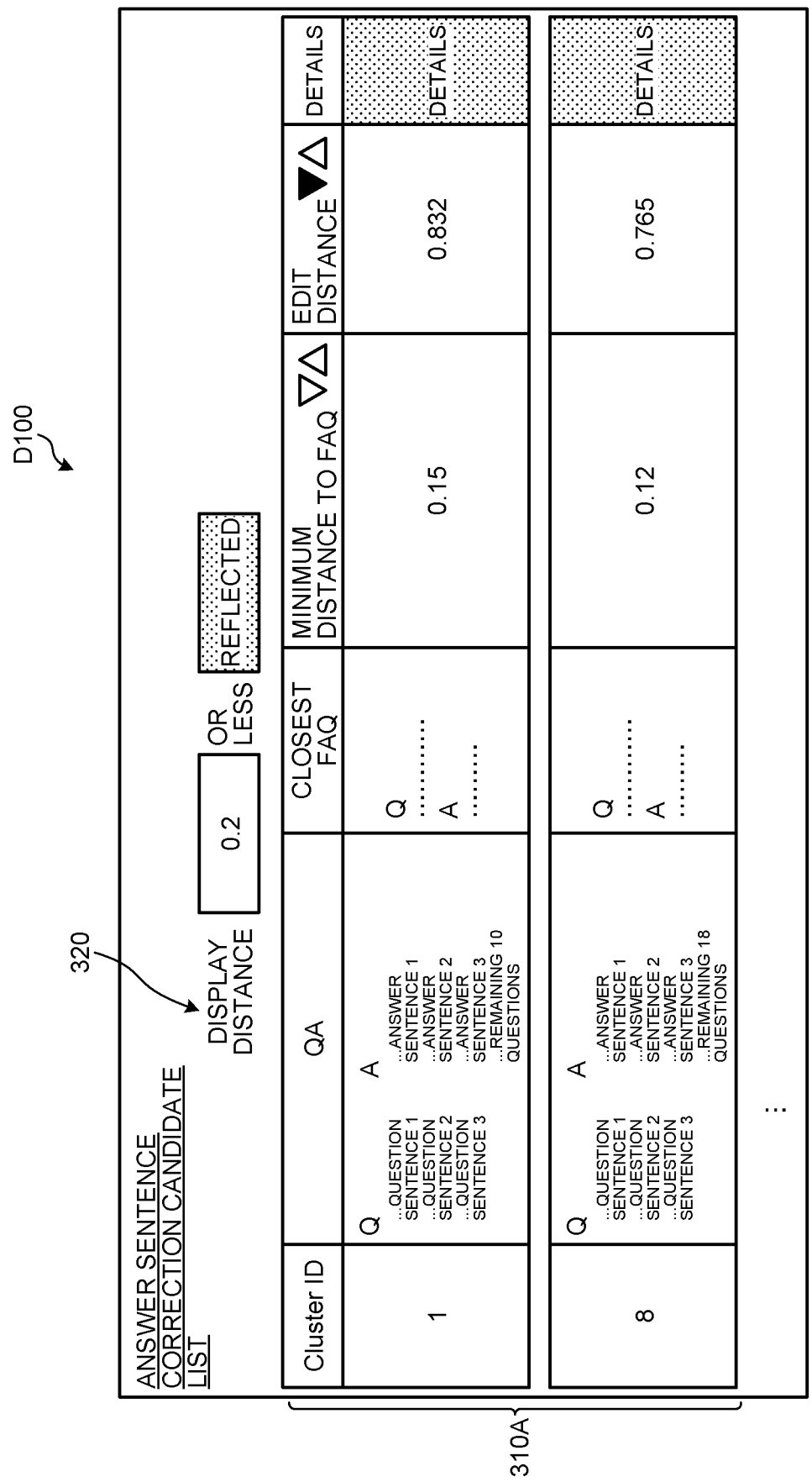
FIG. 8 is a diagram illustrating an example of support information related to change support of FAQ information.

FIG. 8 is a diagram illustrating an example of the support information D100 related to change support of the FAQ information D11. As illustrated in FIG. 8, the support information D100 indicates an answer sentence correction candidate list. The support information D100 includes cluster information 310A and setting information 320. The cluster information 310 includes information of Cluster ID, QA, the closest FAQ, the minimum distance, the edit distance, and details. The closest FAQ includes a representative question sentence and an answer sentence of existing FAQ information D11 similar to a cluster. For example, as the closest FAQ, the FAQ information D11 in which the question sentence of the cluster and the representative question sentence are closest is selected. The edit distance is a distance between the answer sentence of the FAQ information D11 that is the minimum and the latest answer sentence in the cluster. For example, as the edit distance, an edit distance between an answer sentence of the recent history information D20 and the closest FAQ information D11 is set.

Figure 9:
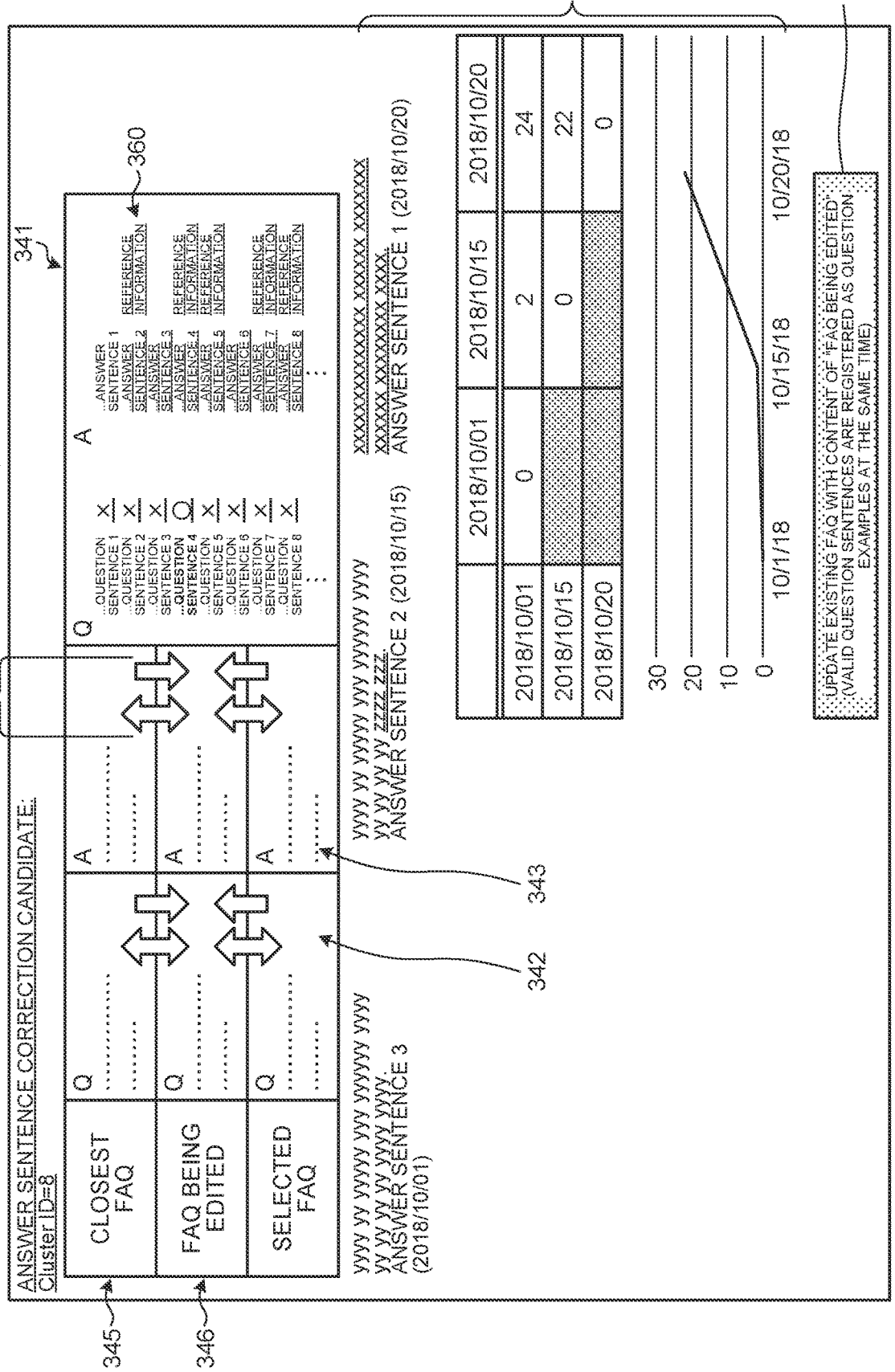
FIG. 9 is a diagram illustrating an example of detailed information included in support information.

FIG. 9 is a diagram illustrating an example of detailed information 340A included in the support information D100. As illustrated in FIG. 9, the support information D100 further includes the detailed information 340A. The detailed information 340A is information presented when the details of the cluster information 310A are selected by the operator OP. The detailed information 340A includes list information 341, question candidate information 342, answer candidate information 343, the closest FAQ 345, FAQ 346 being edited, an operation button 347, a registration button 348, and time series information 350. In the example illustrated in FIG. 9, the detailed information 340A indicates information in a case where the Cluster ID of the cluster information 310 illustrated in FIG. 8 is "8". The list information 341 is information indicating a list of question sentences and answer sentences in QA of the cluster information 310. In the example illustrated in FIG. 9, the list information 341 is configured such that a question sentence cannot be selected and an answer sentence can be selected, but is not limited thereto. For example, as illustrated in FIG. 6 described above, the list information 341 may display question sentences and answer sentences in a selectable manner. Furthermore, the list information 341 includes information for shifting the registration of the question sentence as the question example to be in an invalid state when "x" is selected, and shifting the registration of the question sentence as the question example to be in a valid state when "o" is selected.

The question candidate information 342 is information indicating a question sentence associated with the answer sentence selected in the list information 341 as a correction candidate. The answer candidate information 343 is information indicating the answer sentence selected in the list information 341. In the closest FAQ 345, a pair of a representative question sentence and an answer sentence of the FAQ information D11 set in the closest FAQ of the cluster information 310A of FIG. 8 is set. In the FAQ 346 being edited, a representative question sentence and an answer sentence of the FAQ information D11, or the question candidate information 342 and the answer candidate information 343 are set to be edited. That is, the FAQ 346 being edited is information for causing the operator OP to edit the FAQ information D11. The operation button 347 includes upward arrow and downward arrow buttons for copying and overwriting the question sentence or the answer sentence to other items. The operation button 347 includes a double-headed arrow button for indicating a difference between adjacent question sentences or answer sentences in both sentences. For example, when the double-headed arrow button is selected, the information processing server 20 compares adjacent sentences indicated by the double-headed arrow button, and causes a different portion of each sentence to be displayed with highlight. The operation button 347 is provided so that the double-headed arrow and the single-headed arrow are placed across adjacent question sentences and adjacent answer sentences. The registration button 348 is a button for requesting change of the FAQ information D11 of the closest FAQ 345 among the contents of the question sentence and the answer sentence of the FAQ 346 being edited.

In a case where a plurality of answer sentences exists in the history information D20, the time series information 350 is information indicating a change in the plurality of answer sentences in time series. The time series information 350 includes, for example, information for displaying the answer sentence and the edit distance in time series for each date. In the example illustrated in FIG. 9, the time series information 350 is information for underlining the portion of the answer sentence, which is a difference from the previous one, displaying the mutual edit distance for each date and time, and displaying a time series change in the edit distance from the previous sentence. As a result, since the time series information 350 can indicate where there has been a large change, it is possible to support the operator OP to select an answer sentence from among a plurality of answer sentences in the cluster on the basis of the information.

Furthermore, the operator OP creates an answer sentence from a manual, a business document, or the like at the time of reception. Therefore, in the present embodiment, the support information D100 further includes reference information 360. The reference information 360 is information included in the answer information D22 of the history information D20. Note that the reference information 360 is not included in the support information D100 when it is not set in the answer information D22 of the history information D20. In the present embodiment, the list information 341 is information for displaying in an identifiable manner whether or not the answer information D22 of the history information D20 includes the reference information 360.

Figure 10:
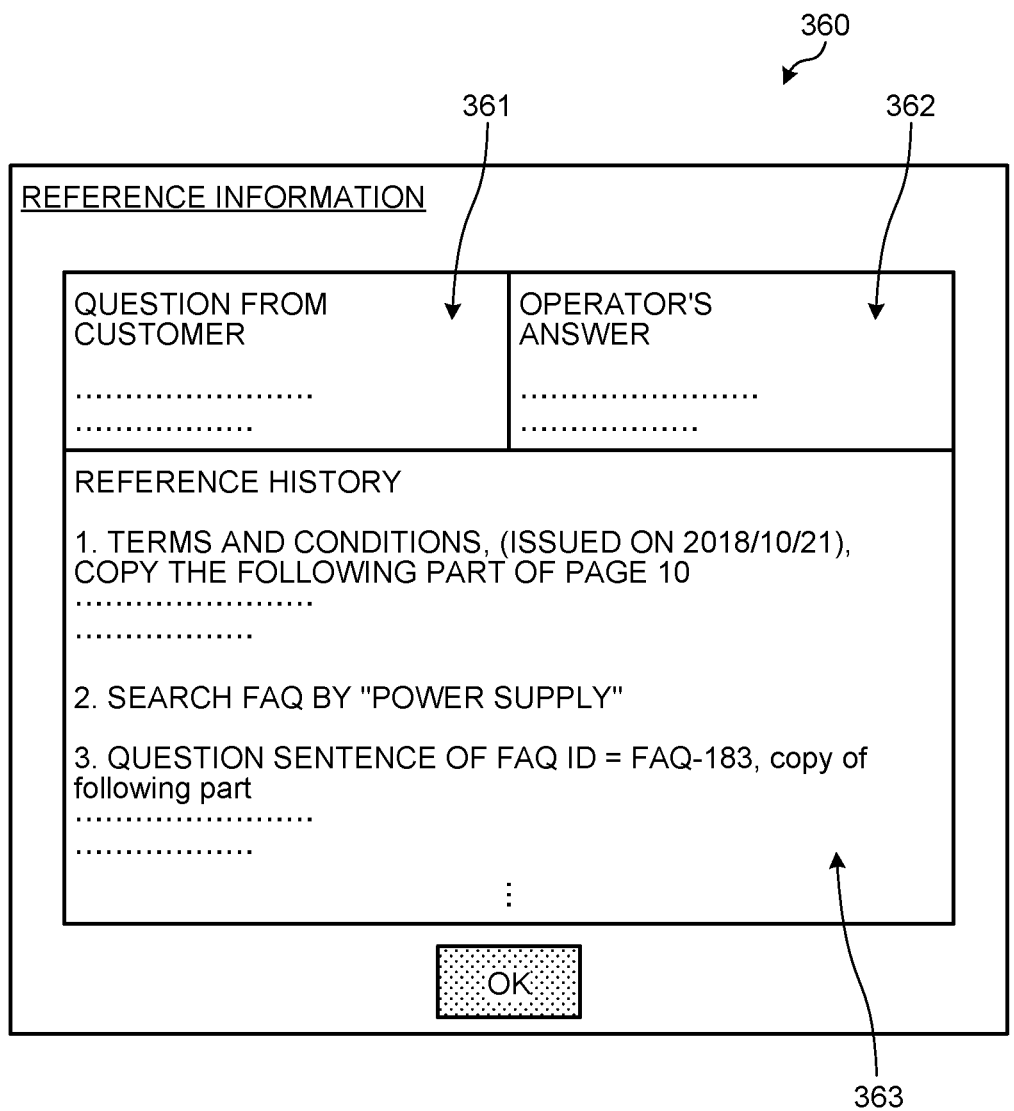
FIG. 10 is a diagram illustrating an example of reference information included in support information.

FIG. 10 is a diagram illustrating an example of the reference information 360 included in the support information D100. As illustrated in FIG. 10, the reference information 360 includes information of a question 361, an answer 362, and a reference history 363. In the question 361, an actual question from the customer is set. In the answer 362, an actual answer of the operator OP is set. In the reference history 363, the history of reference by the operator OP and information indicating details thereof are set. In the example illustrated in FIG. 10, the reference history 363 includes information: terms and conditions, issued on 2018 Oct. 21, and copy the following part of "Page 10". Furthermore, the reference history 363 includes information indicating that FAQ has been searched by "power supply". Furthermore, the reference history 363 includes information indicating "question sentence of FAQ ID=FAQ-183", "copy the following part", and the like. As a result, the reference information 360 can present details of the history of actual reception of the operator OP at the time of correcting the FAQ information D11.

Returning to FIG. 7, the information processing server 20 executes processing of supporting the operator OP on the basis of the support information D100 (step S109). Then, the information processing server 20 acquires the input information D200 input to the support information D100 (step S110). For example, it is assumed that the information processing server 20 causes the detailed information 340A of the support information D100 to be displayed on the display unit 110 of the information processing terminal 10 and detects the operation of the operation button 347 which is the single-headed arrow. In this case, the information processing server 20 copies the question candidate information 342 of the selected FAQ to the item of the question sentence of the FAQ 346 being edited, and accepts a change of the question sentence. Then, when the operation of the registration button 348 is detected, the information processing server 20 acquires information indicating a question sentence and an answer sentence of the FAQ 346 being edited, the FAQ information D11 of the closest FAQ 345, and the like as the input information D200 from the information processing terminal 10.

The information processing server 20 executes processing of constructing and maintaining the FAQ database D1 on the basis of the support information D100 and the input information D200 (step S111). For example, the information processing server 20 executes processing of changing the FAQ information D11 on the basis of the input information D200 and registering the changed FAQ information D11 in the FAQ database D1. As a result, the existing FAQ information D11 is changed in the FAQ database D1. When the processing of step S111 ends, the information processing server 20 ends the processing procedure illustrated in FIG. 7.

In the example of the processing procedure illustrated in FIG. 7, the information processing server 20 functions as the acquisition unit 231 described above by executing the processing of step S101. Then, the information processing server 20 functions as the creation unit 232 described above by executing the processing from steps S102 to S106 and S121 to S124. Then, the information processing server 20 functions as the processing unit 233 described above by executing the processing from steps S109 to S111.

As described above, the information processing apparatus 1S according to the present embodiment creates the support information D100 for supporting a change of existing FAQ information D11 based on the history information D20 by the creation unit 232 on the basis of the distance between the result of clustering and the FAQ information D11. Thus, the information processing apparatus 1S can support a change of the existing FAQ information D11 on the basis of the distance between the result of clustering the history information D20 of reception and the FAQ information D11. As a result, the information processing apparatus 1S can suppress the work load of the operator OP and improve the search accuracy of the FAQ information D11 by supporting the determination of the operator OP who maintains the FAQ database D1 on the basis of the history information D20 of reception.

Furthermore, the information processing apparatus 1S creates the support information D100 including information indicating a change in the answer sentence (second answer) of the history information D20 in time series by the creation unit 232. Thus, the information processing apparatus 1S can support construction and maintenance of the FAQ database D1 on the basis of a change in the answer sentence of the history information D20. For example, when the answer sentence of the history information D20 is frequently used, it means that the answer sentence is valid, and when the answer sentence is not used, it means that the answer sentence needs to be corrected. As a result, the information processing apparatus 1S can support the operator OP in determining whether to change the FAQ information D11 by indicating a change in the answer sentence of reception.

Furthermore, the information processing apparatus 1S creates the support information D100 including the reference information 360 referred to at the time of reception by the operator OP by the creation unit 232. Thus, the information processing apparatus 1S can support construction and maintenance of the FAQ database D1 on the basis of the support information D100 that can be referred to by the reference information 360 included in the history information D20. As a result, the information processing apparatus 1S can support the operator OP in determining whether to change the FAQ information D11 by indicating the reference information 360 actually used at the time of reception.

Furthermore, the information processing apparatus 1S creates the support information D100 for proposing a question sentence (second question) obtained by clustering the history information D20 to the operator OP as question example information (third information) D12 indicating a question example associated with the FAQ information D11 by the creation unit 232. Thus, the information processing apparatus 1S can simultaneously propose correction of the FAQ information D11 and correction of the question example information D12 associated with the FAQ information D11. As a result, since the information processing apparatus 1S can simultaneously correct the FAQ information D11 and the question example information D12, the work efficiency of the operator OP can be further improved.

Example of Information Processing of Associating Question Example Information with FAQ Information Next, an example of information processing of associating the question example information D12 with the FAQ information D11 will be described with reference to FIGS. 11 to 12. For example, the FAQ information D11 is preferably associated with as many pieces of the question example information D12 as possible, but since the association results in a work cost, it is desired to effectively improve the performance of the search model by associating as few pieces of the question example information D12 as possible.

For example, since the history information D20 includes an actual question sentence from the user, the performance of the search model can be improved by associating the question sentence as a question example of the FAQ information D11. The information processing server 20 searches the FAQ information D11 with the search model for the actual question sentence, thereby making the searched FAQ information D11 an association destination candidate. The creation unit 232 of the information processing server 20 creates the support information D100 for supporting registration of a question example as a positive example or a negative example. In this case, the information processing server 20 creates the support information D100 that not only registers the question example information D12 as a positive example, but also registers the question example information D12 as a negative example. For example, the information processing server 20 separately learns a model for determining a negative example and subtracts a score determined as a negative example, thereby improving the performance of the search model. The positive example means, for example, a positive class in a case where a question example associated with the FAQ information D11 is divided into a positive class and a negative class. Then, a negative example means that it is a negative class.

FIG. 11 is a flowchart illustrating an example of a procedure of information processing related to association support of the question example information D12. The processing procedure illustrated in FIG. 11 is realized by the control unit 230 of the information processing server 20 executing a program.

As illustrated in FIG. 11, the information processing server 20 acquires the history information D20 of the reception from the history database D2 (step S201). The information processing server 20 extends the question sentence of the history information D20 on the basis of the synonym data 210$b$ of the storage unit 210 (step S202). For example, when DVD is registered in the synonym data 210$b$ as a synonym of CD, the information processing server 20 extends the word "CD" in the question sentence to "CD/DVD" on the basis of the conversion method of the synonym data 210$b$. In the present embodiment, as the conversion method, a method of extending a word will be described, but it is not limited thereto. For example, the conversion method may include a method of replacing a word with a similar word.

The information processing server 20 searches the association candidate FAQ information for each history question sentence (step S203). For example, in a case where the history question sentence is "CD does not come out", the information processing server 20 searches the FAQ database D1 for the FAQ information D11 having a representative question sentence "CD/DVD cannot be ejected". Then, the information processing server 20 predicts search accuracy in a case where the question sentence is associated with the FAQ information D11 as the question example information D12 for each history question sentence (step S204). For example, the information processing server 20 predicts, as a score (search accuracy), the likelihood of how many question sentences can be covered using the search model. For example, the search accuracy may be predicted on the basis of a result of actual search using a search model, or may be predicted using a prediction program or the like.

The information processing server 20 creates the support information D100 for supporting construction and maintenance of the question example information D12 in the FAQ database D1 on the basis of the prediction result (step S205).

FIG. 12 is a diagram illustrating an example of the support information D100 related to association support of the question example information D12. As illustrated in FIG. 12, the support information D100 indicates a list of question sentences that are candidates for question examples. The support information D100 includes candidate information 400 corresponding to the history question sentence. The candidate information 400 includes information indicating a history question sentence 401, a score 402, a representative question 403, an answer 404, and an evaluation 405. A question sentence (second question) of the history information D20 is set as the history question sentence 401. As the score 402, a value of the predicted score is set. As the representative question 403, a representative question sentence of the searched FAQ information D11 is set. As the answer 404, an answer sentence corresponding to the representative question sentence of the representative question 403 is set. The evaluation 405 includes a button for selecting a positive example, hide, and a negative example.

In the example illustrated in FIG. 12, the support information D100 is information for displaying a list of candidate information 400 corresponding to History-1 and History-2. The candidate information 400 of History-1 includes a question sentence "CD does not come out". In this case, in the candidate information 400, the score 402 of the FAQ information D11 of "CD/DVD cannot be ejected" is higher than the score 402 of the FAQ information D11 of "CD/DVD cannot be played". As a result, in the support information D100, by selecting "positive example" of the evaluation 405 of the FAQ information D11 of "CD/DVD cannot be ejected", it is possible to register the history question sentence in the FAQ database D1 as the question example information D12 of the positive example. In the support information D100, by selecting "negative example" of the evaluation 405 of the FAQ information D11 of "CD/DVD cannot be played", it is possible to register the history question sentence in the FAQ database D1 as the question example information D12 of the negative example. Furthermore, in the support information D100, by selecting "hide" of the evaluation 405 corresponding to the FAQ information D11 of "CD/DVD cannot be played", it is possible to hide the FAQ information D11 of "CD/DVD cannot be played". Then, in the support information D100, in a case where the FAQ information D11 is hidden, other hidden FAQ information D11 can be displayed. When there is a plurality of pieces of candidate information 400, the support information D100 may further include information for displaying the value of the score 402 of the candidate information 400 as a graph associated with the history question sentence 401.

Returning to FIG. 11, the information processing server 20 executes processing of supporting the operator OP on the basis of the support information D100 (step S206). Then, the information processing server 20 acquires the input information D200 input to the support information D100 (step S207). For example, in a case where the support information D100 illustrated in FIG. 12 is displayed on the information processing terminal 10, when a positive example or a negative example of the evaluation 405 of the candidate information 400 is selected, the information processing server 20 acquires information indicating the question sentence 401 of the candidate information 400 and the FAQ information D11 as the input information D200. The input information D200 includes, for example, information indicating that a positive example or a negative example of the evaluation 405 is selected.

The information processing server 20 executes processing of constructing and maintaining the FAQ database D1 on the basis of the support information D100 and the input information D200 (step S208). For example, the information processing server 20 executes processing of creating the question example information D12 indicating a question sentence on the basis of the input information D200 and registering the created question example information D12 in the FAQ database D1 in association with the FAQ information D11. For example, in a case where the input information D200 includes information indicating that the positive example or the negative example of the evaluation 405 is selected, the information processing server 20 creates the question example information D12 including information indicating the positive example or the negative example. Then, the information processing server 20 executes processing of registering the created question example information D12 in the FAQ database D1 in association with the FAQ information D11. Note that the information processing server 20 may classify the question example information D12 into a positive example and a negative example and register the information in the FAQ database D1. As a result, in the FAQ database D1, the question example information D12 based on the history information D20 is associated with the FAQ information D11. When the processing of step S208 ends, the information processing server 20 ends the processing procedure illustrated in FIG. 11.

In the example of the processing procedure illustrated in FIG. 11, the information processing server 20 functions as the acquisition unit 231 described above by executing the processing of step S201. Then, the information processing server 20 functions as the creation unit 232 described above by executing the processing from steps S202 to S203 and S205. Then, the information processing server 20 functions as the processing unit 233 described above by executing the processing from steps S206 to S208. Then, the information processing server 20 functions as the prediction unit 234 described above by executing the processing of step S204.

As described above, the information processing apparatus 1S according to the present embodiment extracts an actual question sentence (second question) of the user from the history information D20 by the creation unit 232, and causes the display unit 110 of the information processing terminal 10 to display a list of the extracted question sentences. Then, the information processing apparatus 1S creates the support information D100 that supports at least one of construction and maintenance of the question example information (third information) D12 in the FAQ database D1. Thus, the information processing apparatus 1S can support construction and maintenance of the question example information D12 of the FAQ database D1 on the basis of a question example of the history information D20. As a result, when the information processing apparatus 1S indicates the list of question sentences of the history information D20, the operator OP is not required to imaginatively construct a question example, and thus it is possible to suppress the work load of the operator OP and improve the search accuracy of the FAQ information D11.

Furthermore, the information processing apparatus 1S creates the support information D100 by converting the question sentence (second question) of the history information (second information) D20 by a predetermined conversion method by the creation unit 232. Thus, the information processing apparatus 1S can achieve consistency in the FAQ database D1 by converting the question sentence of the history information D20. As a result, the information processing apparatus 1S can improve the search accuracy of the FAQ information D11 since the words of the question example information D12 associated with the FAQ information D11 become consistent.

Furthermore, the information processing apparatus 1S creates the support information D100 that supports registration of a question sentence of the history information D20 as a question example of a positive example or a negative example by the creation unit 232. Thus, the information processing apparatus 1S can register the question sentence of the history information D20 not only as a positive example but also as a negative example in the question example information D12. As a result, the information processing apparatus 1S can classify the question example information D12 associated with the FAQ information D11 into a positive example and a negative example, and thus can support improvement in performance of the search model.

Furthermore, the information processing apparatus 1S predicts the search accuracy in a case where the question sentence included in the history information D20 is included in the question example information (third information) D12 by the prediction unit 234. The information processing apparatus 1S creates the support information D100 in which the prediction result of the prediction unit 234 is associated with the question sentence of the history information D20 by the creation unit 232. Thus, the information processing apparatus 1S can support determination as to whether or not to register the question sentence of the history information D20 as the question example information D12 by indicating the search accuracy in a case where the question sentence of the history information D20 is added as the question example information D12. As a result, the information processing apparatus 1S can improve the work efficiency of the operator OP who constructs the question example information D12 in the FAQ database D1 and can improve the search accuracy of the FAQ information D11.

Furthermore, the information processing apparatus 1S creates the support information D100 indicating a plurality of question sentences included in the history information D20 in the order based on the search accuracy in a case where the question sentences are included in the question example information D12 by the creation unit 232. Thus, the information processing apparatus 1S can support determination as to whether or not to register the plurality of question sentences included in the history information D20 as the question example information D12 by indicating the order of search accuracy in a case where the plurality of question sentences of the history information D20 is included in the question example information D12 by the support information D100. As a result, even when a plurality of question sentences is registered in the question example information D12, the information processing apparatus 1S can improve the work efficiency of the operator OP who constructs the question sentence in the FAQ database D1 and can improve the search accuracy of the FAQ information D11.

Example of Information Processing for Supporting Association of Tag Information

Next, an example of information processing of associating the tag information D134 with the FAQ information D11 will be described with reference to FIGS. 13 to 14. For example, in a case where there is similar FAQ information D11, there is a high possibility that the tag information D13 associated with the FAQ information D11 is also similar. The information processing server 20 provides a function of supporting the association of the tag information D13 using the collaborative filtering methodology.

When the tag information D13 associated with the FAQ information D11 is also associated with another piece of FAQ information D11, the creation unit 232 of the information processing server 20 creates the support information D100 for supporting correction of the tag information D13 associated with the FAQ information D11 on the basis of another piece of tag information D13 different from the tag information and associated with the other piece of FAQ information D11.

FIG. 13 is a diagram illustrating an example of association between the FAQ information D11 and the tag information D13. In the example illustrated in FIG. 13, FAQ information D11-1 is associated with three pieces of tag information D13-1, D13-2, and D13-3. Then, the FAQ information D11-1 is associated with two pieces of tag information D13-3 and D13-4.

In the example illustrated in FIG. 13, the creation unit 232 recognizes that the tag information D13-3 associated with the FAQ information D11-1 is also associated with another piece of FAQ information D11-2. The creation unit 232 creates the support information D100 for supporting correction of the tag information D13 associated with the FAQ information D11-1 on the basis of another piece of tag information D13-4 different from the tag information D13-3 and associated with the other piece of FAQ information D11-2.

Figure 14:
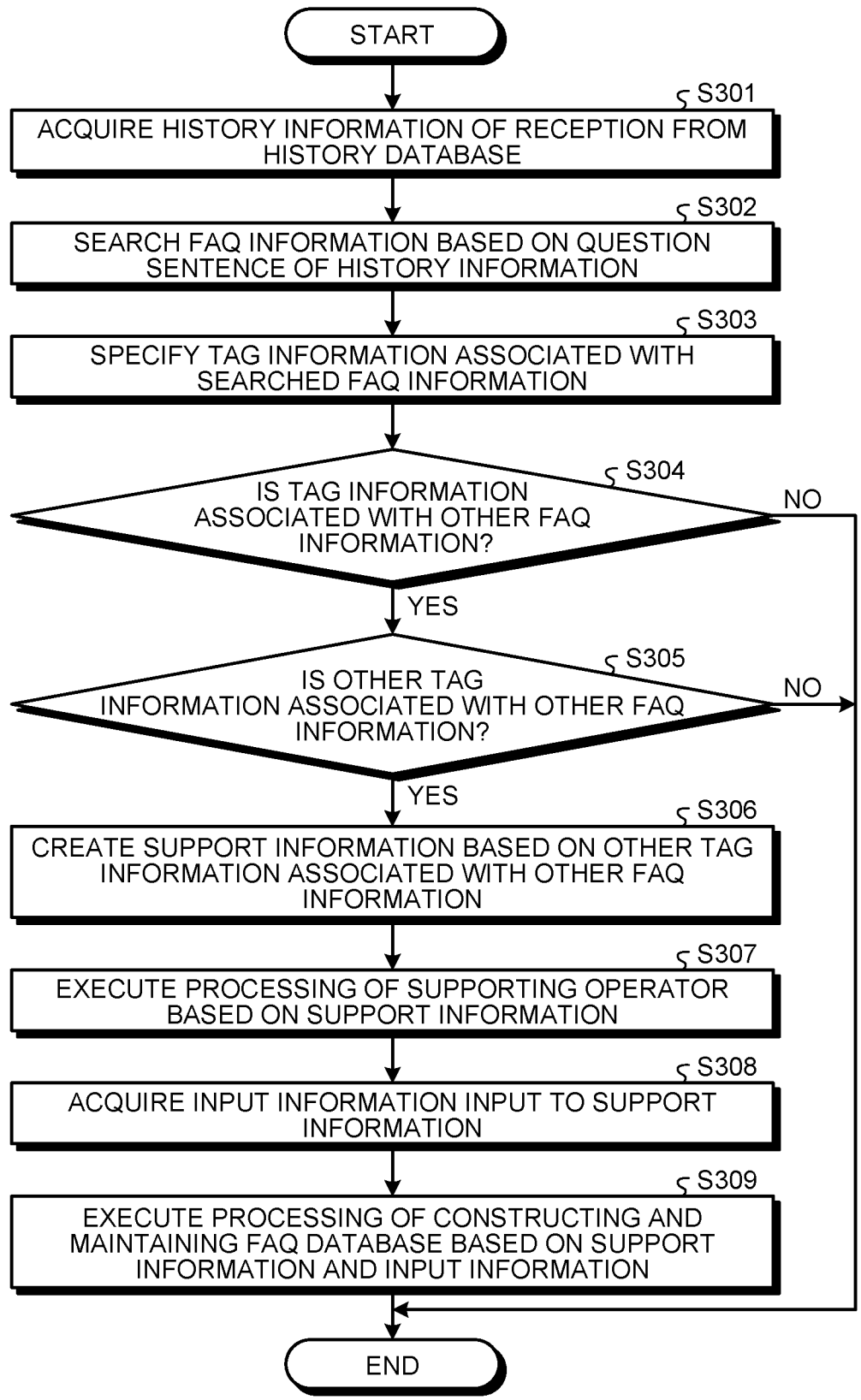
FIG. 14 is a flowchart illustrating an example of a procedure of information processing related to association support of tag information.

FIG. 14 is a flowchart illustrating an example of a procedure of information processing related to association support of the tag information D13. The processing procedure illustrated in FIG. 14 is realized by the control unit 230 of the information processing server 20 executing a program.

As illustrated in FIG. 14, the information processing server 20 acquires the history information D20 of the reception from the history database D2 (step S301). The information processing server 20 searches the FAQ information D11 on the basis of the question sentence of the history information D20 (step S302). The information processing server 20 specifies the tag information D13 associated with the searched FAQ information D11 (step S303). For example, in a case where a plurality of pieces of tag information D13 is associated with the FAQ information D11, the information processing server 20 specifies all the pieces of tag information D13.

The information processing server 20 determines whether or not the tag information D13 is associated with another piece of FAQ information D11 (step S304). For example, in a case where the tag information D13 is associated with a plurality of pieces of FAQ information D11, the information processing server 20 determines that the tag information D13 is associated with another piece of FAQ information D11. In a case where the information processing server 20 determines that the tag information D13 is not associated with another piece of FAQ information D11 (No in step S304), the processing procedure illustrated in FIG. 14 is terminated. That is, the information processing server 20 does not support the association of the tag information D13. Furthermore, in a case where the information processing server 20 determines that the tag information D13 is associated with another piece of FAQ information D11 (Yes in step S304), the processing proceeds to step S305.

The information processing server 20 determines whether or not another piece of tag information D13 is associated with another piece of FAQ information D11 (step S305). In a case where the information processing server 20 determines that the other piece of tag information D13 is not associated (No in step S305), the processing procedure illustrated in FIG. 14 is terminated. Furthermore, in a case where the information processing server 20 determines that the other piece of tag information D13 is associated (Yes in step S305), the processing proceeds to step S306.

The information processing server 20 creates the support information D100 on the basis of the other piece of tag information D13 associated with the other piece of FAQ information D11 (step S306). For example, the information processing server 20 causes the information processing terminal 10 to display the other piece of tag information D13, the other piece of FAQ information D11, and the FAQ information D11 to be associated, and creates the support information D100 for supporting the operator OP to determine association of the other piece of tag information D13 with the FAQ information D11.

The information processing server 20 executes processing of supporting the operator OP on the basis of the support information D100 (step S307). The information processing server 20 acquires the input information D200 input to the support information D100 (step S308). For example, in a case where the support information D100 is displayed on the information processing terminal 10, when the association of the other piece of tag information D13 is requested, the information processing server 20 acquires the input information D200 indicating the other piece of tag information D13 and the FAQ information D11 to be associated.

The information processing server 20 executes processing of constructing and maintaining the FAQ database D1 on the basis of the support information D100 and the input information D200 (step S309). For example, the information processing server 20 executes processing of associating another piece of tag information D13 already existing in the FAQ database D1 with the FAQ information D11 to be associated on the basis of the input information D200. As a result, in the FAQ database D1, the association between the FAQ information D11 and the tag information D13 is changed. When the processing of step S309 ends, the information processing server 20 ends the processing procedure illustrated in FIG. 14.

In the example of the processing procedure illustrated in FIG. 14, the information processing server 20 functions as the acquisition unit 231 described above by executing the processing of step S301. Then, the information processing server 20 functions as the creation unit 232 described above by executing the processing from steps S302 to S306. Then, the information processing server 20 functions as the processing unit 233 described above by executing the processing from steps S307 to S309.

As described above, the information processing apparatus 1S according to the present embodiment determines that the tag information (fourth information) D13 associated with the FAQ information (first information) D11 is also associated with the other piece of FAQ information D11 by the creation unit 232. The information processing apparatus 1S creates the support information D100 for supporting correction of the tag information D13 associated with the FAQ information D11 on the basis of the other piece of tag information D13 different from the tag information D13 and associated with the other piece of FAQ information D11. Thus, the information processing apparatus 1S can support association of new tag information D13 with the FAQ information D11 on the basis of tag information D13 associated with similar FAQ information D11. As a result, since the support information D100 indicates the tag information D13 associated with the other piece of FAQ information D11, the information processing apparatus 1S eliminates the need for the operator OP to imaginatively construct the tag information D13, and thus it is possible to suppress the work load of the operator OP and improve the search accuracy of the FAQ information D11.

For example, the information processing server 20 described above may obtain the closeness between the tags in a range of 0 to 1 (1 is the closest) by the Jaccard coefficient. In this case, the information processing server 20 can obtain the distance matrix by calculating the closeness between all the pieces of tag information D13. Then, the information processing server 20 extracts rows from the matrix for the tag information D13 associated with a certain piece of FAQ information D11, and adds all the rows together. As a result, the information processing server 20 obtains a vector of the number of 1×tag information D13, and filters (sets the value to 0) the column of the tag information D13 associated with the FAQ information D11. Thus, the information processing server 20 can calculates, as a numerical value, tag information D13 close to tag information D13 that is not yet associated with the FAQ information D11 for each column, that is, for each tag information D13.

Example of Information Processing for Supporting Correction of Tag Information

For example, an inquiry condition in which the number of search results of the FAQ information D11 is equal to or less than a threshold value as a result of search with the current search model including the tag conditions is extracted on the basis of the inquiry information D21 of the history information D20. These conditions are considered to have few search results because the tag or question sentence is inappropriate. By taking a difference between these conditions and the number of search results in a case where the tag conditions are ignored, it is possible to confirm whether or not the tag influences the search results. In order to see the degree of influence for each tag, the information processing server 20 adds a result obtained by dividing the number of cases having differences by the number of tags specified at that time to a set of ignored tags for each tag as an index. Thus, the information processing server 20 can calculate the average number of filtered cases for each tag. The information processing server 20 provides a function of prompting correction of the tag information D13 by rearranging the tags by the number of cases and presenting the FAQ information D11 linked to the tags and the inquiry condition under which the tags are specified to the operator OP as additional information.

Figure 15:
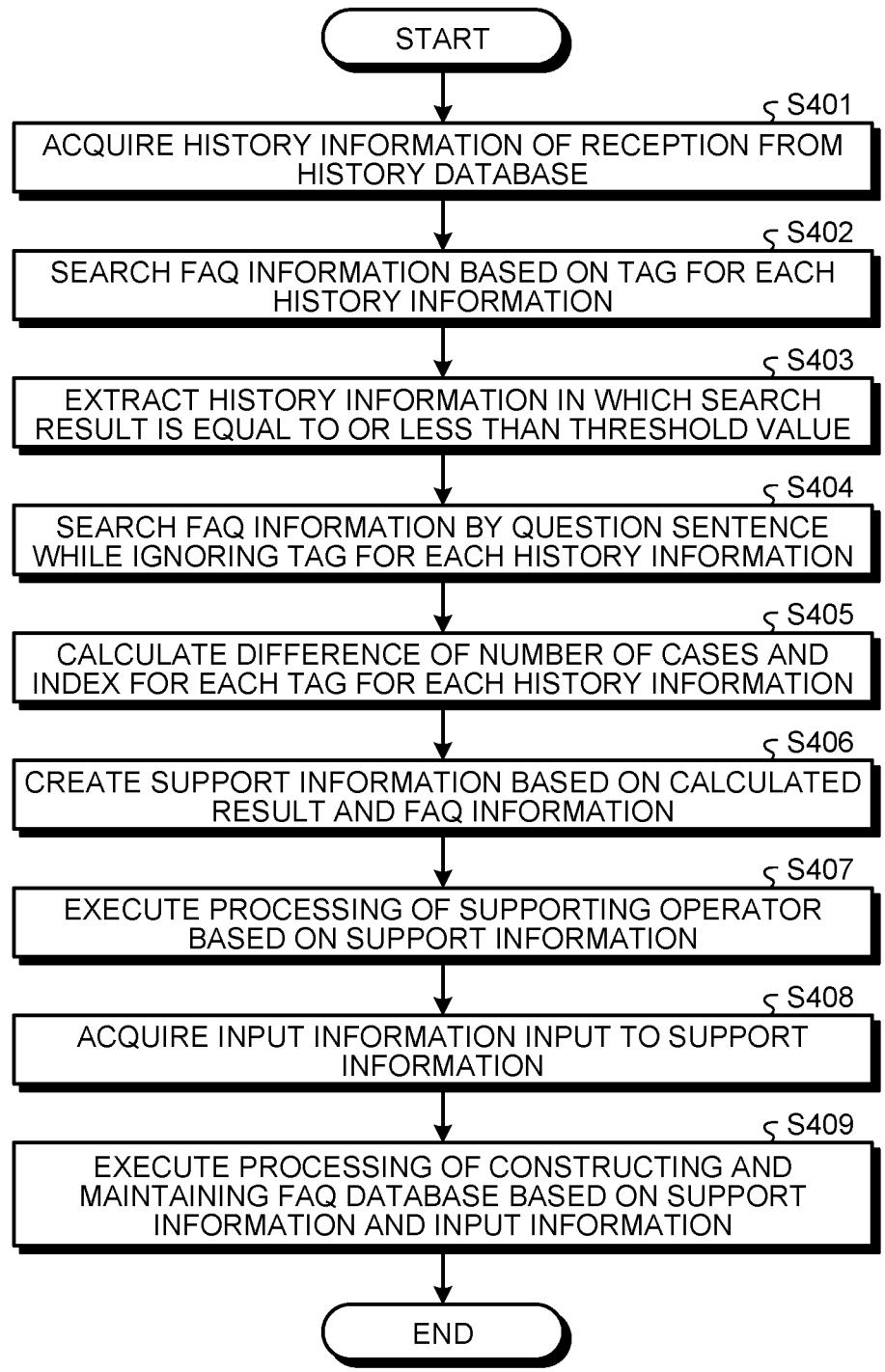
FIG. 15 is a flowchart illustrating an example of a procedure of information processing related to correction support of tag information.

FIG. 15 is a flowchart illustrating an example of a procedure of information processing related to correction support of the tag information D13. The processing procedure illustrated in FIG. 15 is realized by the control unit 230 of the information processing server 20 executing a program.

As illustrated in FIG. 15, the information processing server 20 acquires the history information D20 of the reception from the history database D2 (step S401). The information processing server 20 searches the FAQ information D11 on the basis of the tag for each piece of history information D20 (step S402). For example, the information processing server 20 searches the FAQ information D11 using the search model under the condition of the tag of the history information D20.

The information processing server 20 extracts the history information D20 the search result of which is equal to or less than the threshold value (step S403). The threshold value is, for example, a value set for determining that the tag information D13 is inappropriate and the number of search results is small. The information processing server 20 searches the FAQ information D11 using a question sentence while ignoring the tag for each piece of history information D20 (step S404). For example, the information processing server 20 searches the FAQ information D11 using the search model under the condition of the question sentence of the history information D20.

The information processing server 20 calculates a difference in the number of cases and an index for each tag for each piece of history information D20 (step S405). For example, the information processing server 20 calculates the index by dividing the number of cases having differences by the number of tags specified at that time with respect to the set of ignored tags. In other words, the information processing server 20 adds a value obtained by dividing the increase in the search result by the specified number of tags for each tag as an index. Thus, the information processing server 20 takes a difference from the number of search results in a case where the tag condition is ignored, thereby confirming whether or not the tag has an influence.

The information processing server 20 creates the support information D100 on the basis of the calculated result and the FAQ information D11 (step S406). For example, the information processing server 20 calculates the average number of filtered cases for each tag, arranges the tags by the number of cases, and creates the support information D100 presenting the FAQ information D11 associated with the tag and the question sentence in which the tag is specified as the additional information.

The information processing server 20 executes processing of supporting the operator OP on the basis of the support information D100 (step S407). Then, the information processing server 20 acquires the input information D200 input to the support information D100 (step S408). For example, in a case where the support information D100 is displayed on the information processing terminal 10, the information processing server 20 acquires the input information D200 indicating the correction information for correcting the tag.

The information processing server 20 executes processing of constructing and maintaining the FAQ database D1 on the basis of the support information D100 and the input information D200 (step S409). For example, the information processing server 20 executes processing of correcting the tag information D13 already existing in the FAQ database D1 on the basis of the input information D200. As a result, the existing tag information D13 is corrected in the FAQ database D1. When the processing of step S409 ends, the information processing server 20 ends the processing procedure illustrated in FIG. 15.

In the example of the processing procedure illustrated in FIG. 15, the information processing server 20 functions as the acquisition unit 231 described above by executing the processing of step S401. Then, the information processing server 20 functions as the creation unit 232 described above by executing the processing from steps S402 to S406. Then, the information processing server 20 functions as the processing unit 233 described above by executing the processing from steps S407 to S409.

As described above, in a case where the history information (second information) D20 includes the question sentence from the user and the tag that classifies the question sentence, the information processing apparatus 1S according to the present embodiment obtains a first search result obtained by searching the FAQ information D11 under the condition including the tag and a second search result obtained by searching the FAQ information D11 under the condition not including the tag by the creation unit 232. The information processing apparatus 1S creates the support information D100 for supporting correction of the tag information D13 associated with the FAQ information D11 by the creation unit 232 on the basis of the first search result and the second search result. Thus, the information processing apparatus 1S can indicate search results in a case where the tag of the history information D20 is included and a case where the tag is not included by the support information D100. As a result, the information processing apparatus 1S can support the operator OP to determine as to whether or not to add to the tag information D13 by indicating the search result in a case where the tag of the history information D20 is registered by the tag information D13 by the support information D100, and the work load of the operator OP can be further suppressed.

The above-described first embodiment is an example, and various modifications and applications are possible. For example, the plurality of pieces of information processing related to construction and maintenance of the FAQ database D1 can be executed in appropriate combination.

Second Embodiment

Figure 16:
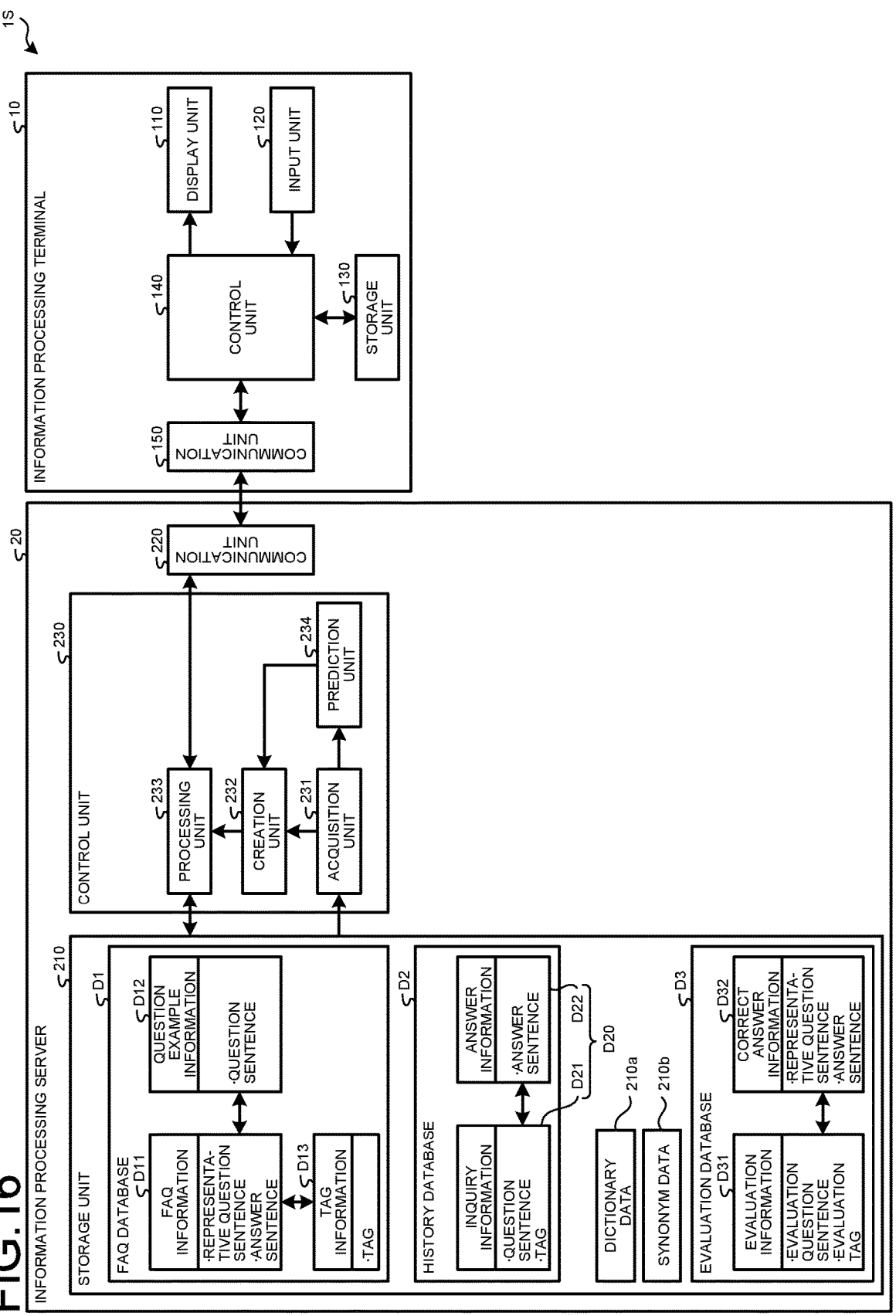
FIG. 16 is a diagram illustrating an example of a configuration of an information processing apparatus according to a second embodiment.

Configuration Example of the Information Processing Apparatus According to the Second Embodiment Next, the second embodiment will be described. FIG. 16 is a diagram illustrating an example of a configuration of the information processing apparatus 1S according to the second embodiment. As illustrated in FIG. 16, the information processing apparatus 1S includes the information processing terminal 10 and the information processing server 20. The information processing apparatus 1S according to the second embodiment is different from the first embodiment in that an evaluation database D3 is stored in the storage unit 210. Note that the evaluation database D3 may be stored in a storage apparatus or the like accessible by the information processing server 20.

For example, since the search model is realized by machine learning or the like, an evaluation set is required to measure the degree of accuracy. The evaluation set is expressed by a set specifying correct FAQ information D11 with respect to an inquiry (for example, question sentences, tags, and the like) from the user. Furthermore, the evaluation value can be calculated by examining how many correct FAQ have been searched as a result of the search based on the inquiry content with the current search model. The information processing server 20 according to the second embodiment refers to the evaluation database D3 indicating the evaluation set and provides a function of supporting construction and maintenance of the FAQ database D1.

The evaluation database D3 is constructed by a third party or the like in order to evaluate whether there is a contradiction in the FAQ database D1. The evaluation database D3 includes, for example, evaluation information D31 and correct answer information D32. The evaluation information D31 and the correct answer information D32 form a set. The evaluation information D31 includes, for example, an evaluation question sentence and an evaluation tag. The evaluation question sentence is a question sentence used as a condition at the time of searching. The evaluation tag is a tag used as a condition at the time of searching. The correct answer information D32 is information of a correct answer in a case where searching is performed by the search model using the evaluation information D31. The correct answer information D32 includes a representative question sentence and an answer sentence. As the representative question sentence, for example, a representative question sentence or the like of the FAQ information D11 before change may be set. As the answer sentence, for example, an answer sentence or the like of the FAQ information D11 before change may be set.

The creation unit 232 of the information processing server 20 provides a function of creating the support information D100 that supports correction of the tag information D13 associated with the FAQ information D11 on the basis of the FAQ information D11 and the evaluation information D31 with respect to the user's inquiry searched by the search model.

Figure 17:
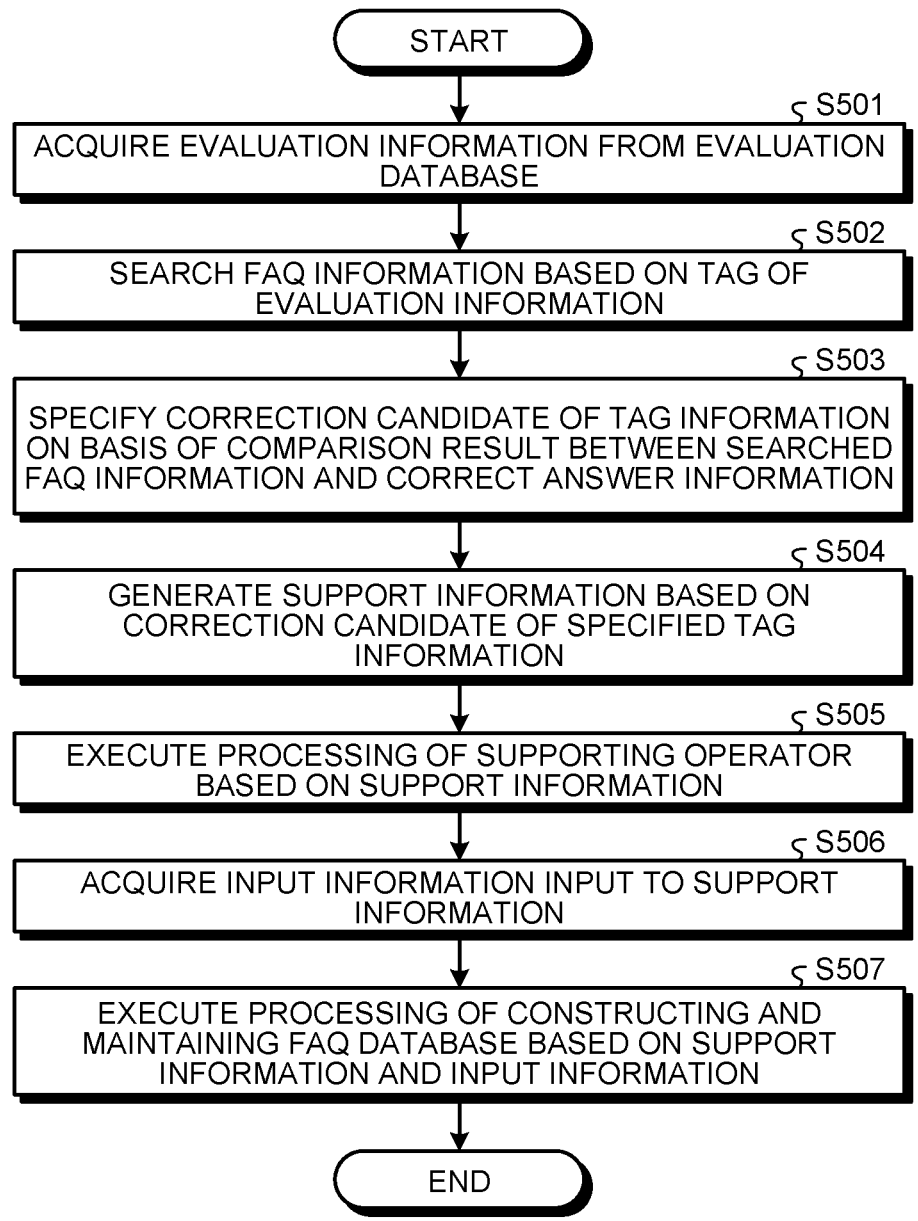
FIG. 17 is a flowchart illustrating an example of a procedure of information processing related to correction support of tag information using evaluation information.

FIG. 17 is a flowchart illustrating an example of a procedure of information processing related to correction support of the tag information D13 using the evaluation information D31. The processing procedure illustrated in FIG. 17 is realized by the control unit 230 of the information processing server 20 executing a program.

As illustrated in FIG. 17, the information processing server 20 acquires the evaluation information D31 from the evaluation database D3 (step S501). The information processing server 20 searches the FAQ information D11 on the basis of the tag of the evaluation information D31 (step S502). For example, the information processing server 20 searches the FAQ information D11 using the search model under the condition of the tag of the evaluation information D31.

The information processing server 20 specifies a correction candidate of the tag information D13 on the basis of a comparison result between the searched FAQ information D11 and the correct answer information D32 (step S503). The information processing server 20 creates the support information D100 on the basis of the specified tag information D13 (step S504). For example, the information processing server 20 creates the support information D100 for proposing a tag that cannot search the FAQ information D11 corresponding to the correct answer information D32 to the operator OP as a correction candidate of the FAQ information D11.

The information processing server 20 executes processing of supporting the operator OP on the basis of the support information D100 (step S505). Then, the information processing server 20 acquires the input information D200 input to the support information D100 (step S506). For example, in a case where the support information D100 is displayed on the information processing terminal 10, the information processing server 20 acquires the input information D200 indicating the correction information for correcting the tag.

The information processing server 20 executes processing of constructing and maintaining the FAQ database D1 on the basis of the support information D100 and the input information D200 (step S507). For example, the information processing server 20 executes processing of correcting the tag information D13 associated with the FAQ database D1, associating new tag information D13 with the FAQ database D1, and the like on the basis of the input information D200. As a result, in the FAQ database D1, the new tag information D13 is associated with the FAQ information D11. When the processing of step S507 ends, the information processing server 20 ends the processing procedure illustrated in FIG. 17.

In the example of the processing procedure illustrated in FIG. 17, the information processing server 20 functions as the acquisition unit 231 described above by executing the processing of step S501. Then, the information processing server 20 functions as the creation unit 232 described above by executing the processing from steps S502 to S504. Then, the information processing server 20 functions as the processing unit 233 described above by executing the processing from steps S505 to S507.

As described above, the information processing apparatus 1S according to the present embodiment creates the support information D100 for supporting correction of the tag information (fourth information) D13 associated with the FAQ information D11 by the creation unit 232 on the basis of the FAQ information (first information) D11 and the evaluation information D31 with respect to the user's inquiry searched by the search model. Thus, the information processing apparatus 1S can indicate the FAQ information D11 searched by the search model and the evaluation information D31 by the support information D100. As a result, the information processing apparatus 1S can cause the operator OP to objectively determine the change of the FAQ database D1 on the basis of the searched FAQ information D11 and the evaluation information D31, so that the work load of the operator OP can be further suppressed.

[Hardware Configuration]

Figure 18:
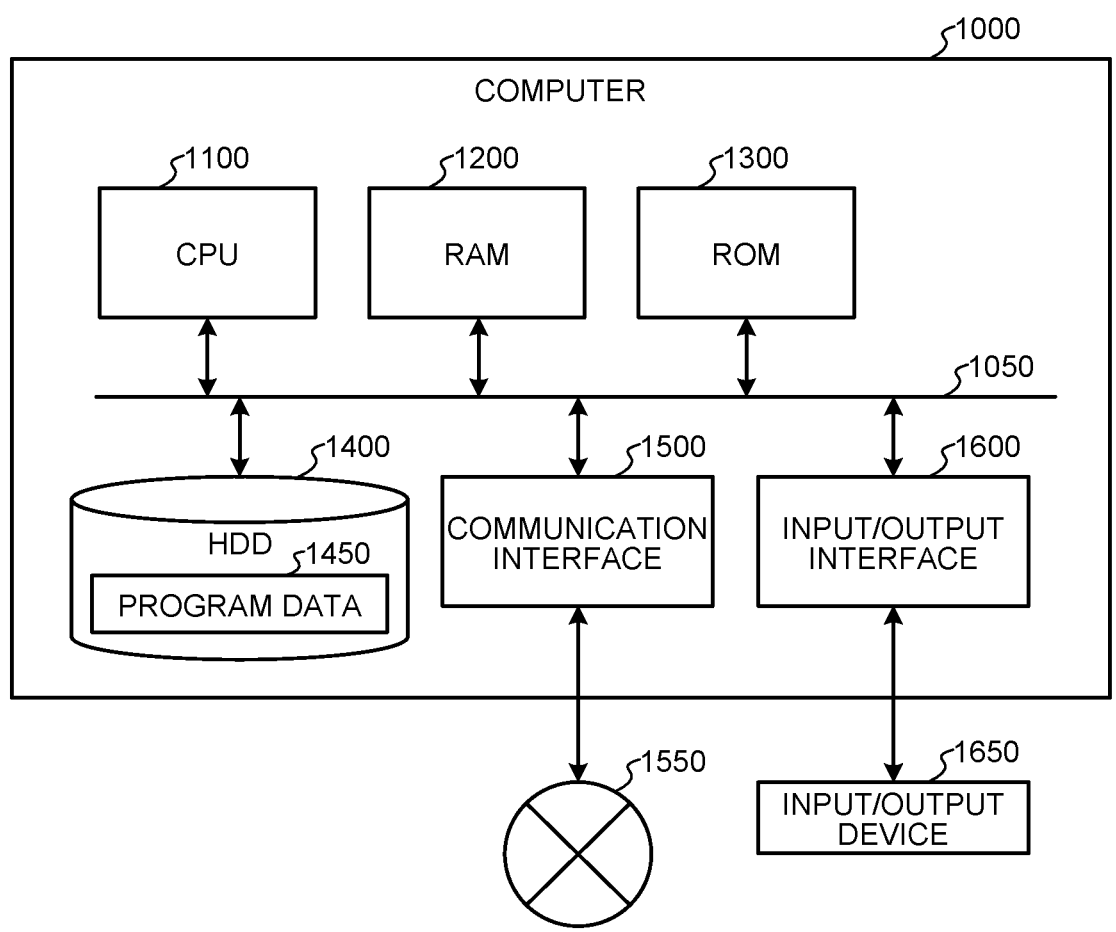
FIG. 18 is a hardware configuration diagram illustrating an example of a computer that implements a function of an information processing server.

The information processing apparatus according to the above-described embodiments is realized by a computer 1000 having the configuration as illustrated, for example, in FIG. 12. Hereinafter, the information processing server 20 according to the embodiments will be described as an example. FIG. 18 is a hardware configuration diagram illustrating an example of the computer 1000 that implements the function of the information processing server 20. The computer 1000 includes a CPU 1100, a RAM 1200, a read only memory (ROM) 1300, a hard disk drive (HDD) 1400, a communication interface 1500, and an input/output interface 1600. Each unit of the computer 1000 is connected by a bus 1050.

The CPU 1100 operates on the basis of a program stored in the ROM 1300 or the HDD 1400, and controls each unit. For example, the CPU 1100 loads the program stored in the ROM 1300 or the HDD 1400 to the RAM 1200, and executes processing corresponding to various programs.

The ROM 1300 stores a boot program such as a basic input output system (BIOS) executed by the CPU 1100 when the computer 1000 is activated, a program depending on hardware of the computer 1000, and the like.

The HDD 1400 is a computer-readable recording medium that non-transiently records a program executed by the CPU 1100, data used by the program, and the like. Specifically, the HDD 1400 is a recording medium that records a program according to the present disclosure, which is an example of program data 1450.

The communication interface 1500 is an interface for the computer 1000 to connect to an external network 1550 (for example, the Internet). For example, the CPU 1100 receives data from another device or transmits data generated by the CPU 1100 to another device via the communication interface 1500.

The input/output interface 1600 is an interface for connecting an input/output device 1650 and the computer 1000. For example, the CPU 1100 receives data from an input device such as a keyboard and a mouse via the input/output interface 1600. Furthermore, the CPU 1100 transmits data to an output device such as a display, a speaker, a printer, or the like via the input/output interface 1600. Furthermore, the input/output interface 1600 may function as a media interface that reads a program or the like recorded in a predetermined recording medium (medium). The medium is, for example, an optical recording medium such as a digital versatile disc (DVD), a magneto-optical recording medium such as a magneto-optical disk (MO), a tape medium, a magnetic recording medium, a semiconductor memory, or the like.

For example, in a case where the computer 1000 functions as the information processing server 20 according to the embodiment, the CPU 1100 of the computer 1000 executes a program loaded on the RAM 1200 to implement the functions of the acquisition unit 231, the creation unit 232, the processing unit 233, the prediction unit 234, and the like. Furthermore, the HDD 1400 stores a program according to the present disclosure and data in the storage unit 210. Note that the CPU 1100 reads the program data 1450 from the HDD 1400 and executes the program data, but as another example, these programs may be acquired from another apparatus via the external network 1550.

While the preferred embodiments of the present disclosure have been described in detail above with reference to the accompanying drawings, the technical scope of the present disclosure is not limited to or by such examples. It will be apparent to those skilled in the art of the present disclosure that various modifications and alterations can be conceived within the scope of the technical idea described in the claims and naturally fall within the technical scope of the present disclosure.

Further, the effects described in the present specification are merely illustrative or exemplary and are not limited. That is, the technology according to the present disclosure can have other effects apparent to those skilled in the art from the description of the present specification, in addition to or instead of the above effects.

Furthermore, it is also possible to create a program for causing hardware such as a CPU, a ROM, and a RAM built in a computer to exhibit a function equivalent to the configuration of the information processing server 20, and a computer-readable recording medium recording the program can also be provided.

Furthermore, each step related to the processing of the information processing apparatus of the present specification is not necessarily processed in time series in the order described in the flowchart. For example, each step related to the processing of the information processing apparatus may be processed in an order different from the order described in the flowchart, or may be processed in parallel.

Furthermore, in the present embodiment described above, the case where the first information is the FAQ information D11 has been described as an example of the first information, but the information processing apparatus 1S is not limited thereto. For example, the first information may be configured to include a representative question sentence, an answer sentence, and other information.

Note that the following configurations are also included in the technical scope of the present disclosure.

(1)
An information processing apparatus comprising:
a creation unit configured to create support information for supporting at least one of construction and maintenance of a database on the basis of first information including a representative question and an answer sentence associated with the representative question and stored in the database stored in a storage unit and second information indicating a history of reception with respect to a user; and
a processing unit configured to execute processing of performing at least one of construction and maintenance of the database on the basis of input information input to the support information created by the creation unit.

(2)
The information processing apparatus according to (1), wherein
the creation unit creates the support information on the basis of a distance between a result of clustering at least one of a second question from the user indicated by the second information and an actual second answer to the second question and the first information.

(3)
The information processing apparatus according to (2), wherein
the creation unit creates the support information for supporting construction of new first information based on the second information in the database on the basis of the distance between a result of the clustering and the first information.

(4)
The information processing apparatus according to (2) or (3), wherein
the creation unit creates the support information for displaying a plurality of pieces of the second information in a selectable manner in an order according to a distance between each of the plurality of pieces of the second information and the first information.

(5)
The information processing apparatus according to any one of (2) to (4), further comprising:
a prediction unit configured to predict a likelihood of the reception of the new first information with respect to the user when the new first information based on the second information is constructed in the database, wherein
the creation unit creates the support information in which a prediction result of the prediction unit is associated with the new first information.

(6)
The information processing apparatus according to any one of (2) to (5), wherein
the creation unit determines granularity of the clustering on the basis of existing first information stored in the database.

(7)
The information processing apparatus according to any one of (2) to (6), wherein
the creation unit creates the support information including information indicating a change in the second answer of the second information in time series.

(8)
The information processing apparatus according to any one of (2) to (7), wherein
the creation unit creates the support information including reference information referred by an operator during the reception.

(9)
The information processing apparatus according to any one of (2) to (8), wherein
the creation unit creates the support information for proposing the second question obtained by clustering the second information to an operator as third information indicating a question example associated with the first information.

(10)
The information processing apparatus according to any one of (1) to (9), wherein the database further stores third information indicating a question example associated with the first information, and the creation unit extracts an actual second question of the user from the second information, causes a display unit to display a list of the extracted second questions, and creates the support information for supporting at least one of construction and maintenance of the third information in the database.

(11)

The information processing apparatus according to (10), wherein the creation unit creates the support information by converting the second question of the second information by a predetermined conversion method.

(12)

The information processing apparatus according to any one of (9) to (11), wherein the creation unit creates the support information for supporting registration of the second question of the second information as the question example of a positive example or a negative example.

(13)

The information processing apparatus according to any one of (10) to (12), further comprising:

a prediction unit configured to predict search accuracy in a case where the second question included in the second information is included in the third information, wherein the creation unit creates the support information in which a prediction result of the prediction unit is associated with the second question.

(14)

The information processing apparatus according to (13), wherein the creation unit creates the support information indicating a plurality of the second questions included in the second information in an order based on the search accuracy when included in the third information.

(15)

The information processing apparatus according to any one of (1) to (14), wherein the database further stores fourth information indicating a tag associated with the first information, and when the fourth information associated with the first information is also associated with another piece of first information, the creation unit creates the support information for supporting correction of the fourth information associated with the first information on the basis of another piece of fourth information different from the fourth information and associated with the other piece of first information.

(16)

The information processing apparatus according to (15), wherein when the second information includes a question sentence from the user and a tag for classifying the question sentence, the creation unit creates the support information for supporting correction of the fourth information associated with the first information on the basis of a first search result obtained by searching the first information under a condition including the tag and a second search result obtained by searching the first information under a condition not including the tag.

(17)

The information processing apparatus according to (15) or (16), wherein the creation unit creates the support information for supporting correction of the fourth information associated with the first information on the basis of the first information and evaluation information with respect to an inquiry from the user searched by the search model.

(18)

An information processing method comprising, by a computer:

creating support information for supporting at least one of construction and maintenance of a database on the basis of first information including a representative question and an answer sentence associated with the representative question and stored in the database stored in a storage unit and second information indicating a history of reception with respect to a user; and executing processing of performing at least one of construction and maintenance of the database on the basis of input information input to the created support information.

(19)

A program for causing a computer to function as:

a creation unit configured to create support information for supporting at least one of construction and maintenance of a database on the basis of first information including a representative question and an answer sentence associated with the representative question and stored in the database stored in a storage unit and second information indicating a history of reception with respect to a user; and a processing unit configured to execute processing of performing at least one of construction and maintenance of the database on the basis of input information input to the support information created by the creation unit.

REFERENCE SIGNS LIST

1S INFORMATION PROCESSING APPARATUS
10 INFORMATION PROCESSING TERMINAL
20 INFORMATION PROCESSING SERVER
110 DISPLAY UNIT
120 INPUT UNIT
130 STORAGE UNIT
140 CONTROL UNIT
150 COMMUNICATION UNIT
210 STORAGE UNIT
220 COMMUNICATION UNIT
230 CONTROL UNIT
231 ACQUISITION UNIT
232 CREATION UNIT
233 PROCESSING UNIT
234 PREDICTION UNIT
310 CLUSTER INFORMATION
320 SETTING INFORMATION
330 LIKELIHOOD INFORMATION
340 DETAILED INFORMATION
340A DETAILED INFORMATION
D1 FAQ DATABASE
D2 HISTORY DATABASE
D3 EVALUATION DATABASE
D11 FAQ INFORMATION
D12 QUESTION EXAMPLE INFORMATION
D13 TAG INFORMATION
D20 HISTORY INFORMATION
D21 INQUIRY INFORMATION
D22 ANSWER INFORMATION
D31 EVALUATION INFORMATION
D32 CORRECT ANSWER INFORMATION
D100 SUPPORT INFORMATION
D200 INPUT INFORMATION

The invention claimed is:

1. An information processing apparatus, comprising:
a processor configured to;
    create support information for supporting at least one of construction and maintenance of a database based on first information and second information, wherein the first information includes
        a plurality of first questions, wherein a first question of the plurality of first questions corresponds to a representative question which is a question sentence from a user assumed in advance, and
        an answer sentence associated with the representative question,
        the first information is stored in the database, and
        the second information indicates history information of the user;
    extract a first question of a plurality of second questions of the user from the second information:
    control a display unit to display the extracted first question of the plurality of second questions;
    control storage of third information, wherein the third information indicates a question example associated with the first information;
    create the support information for supporting at least one of construction and maintenance of the third information in the database; and
    execute processing of the at least one of the construction and the maintenance of the database based on input information input to the created support information.

2. The information processing apparatus according to claim 1, wherein the processor is further configured to create the support information based on a distance between a result of clustering and the first information, wherein the clustering is of at least one of the first question of the plurality of second questions from the user indicated by the second information and a second answer to the first question of the plurality of second questions.

3. The information processing apparatus according to claim 2, wherein the processor is further configured to create the support information that supports construction of a second question of the plurality of first questions included in the first information, wherein
    the second question of the plurality of first questions included in the first information is based on the second information in the database, and
    the creation of the support information is based on the distance between the result of the clustering and the first information.

4. The information processing apparatus according to claim 3, wherein the processor is further configured to create the support information that displays a plurality of pieces of the second information in a selectable manner in an order based on a distance between each of the plurality of pieces of the second information and the first information.

5. The information processing apparatus according to claim 4, wherein the processor is further configured to:
    predict a likelihood of reception of the second question of the plurality of first questions with respect to the user based on a determination that the second question of the plurality of first questions, which is based on the second information, is constructed in the database, and
    create the support information in which a prediction result of the predicted likelihood is associated with the second question of the plurality of first questions.

6. The information processing apparatus according to claim 2, wherein the processor is further configured to determine granularity of the clustering based on the first information stored in the database.

7. The information processing apparatus according to claim 2,
    wherein the processor is further configured to create the support information including information which indicates a change in the second answer to the first question of the plurality of second questions of the second information in time series.

8. The information processing apparatus according to claim 2, wherein the processor is further configured to create the support information including reference information referred by an operator during reception of the history information.

9. The information processing apparatus according to claim 2, wherein the processor is further configured to create the support information for proposing the first question of the plurality of second questions obtained by clustering the second information to an operator as the third information indicating a question example associated with the first information.

10. The information processing apparatus according to claim 1, wherein the processor is further configured to create the support information based on a conversion of the first question of the plurality of second questions of the second information by a specific conversion method.

11. The information processing apparatus according to claim 1, wherein the processor is further configured to create the support information which supports registration of the first question of the plurality of second questions of the second information as the question example of a positive example or a negative example.

12. The information processing apparatus according to claim 1, wherein the processor is further configured to:
    predict search accuracy based on a determination that the first question of the plurality of second questions of the second information is included in the third information; and
    create the support information in which a prediction result of the predicted search accuracy associated with the first question of the plurality of second questions.

13. The information processing apparatus according to claim 12, wherein the processor is further configured to create the support information which indicates the plurality of second questions included in the second information in an order based on the search accuracy when included in the third information.

14. The information processing apparatus according to claim 1, wherein
    the database further stores fourth information which indicates a tag associated with the first information,
    when the fourth information associated with the first question of the plurality of first questions of the first information is also associated with a second question of the plurality of first questions of the first information, the processor is further configured to create the support information which supports correction of the fourth information associated with the first information, and
    the creation of the support information is based on a first piece of the fourth information different from a second piece of the fourth information and associated with the second question of the plurality of first questions of the first information.

15. The information processing apparatus according to claim 14, wherein when the second information includes a question sentence from the user and a tag for classifying the question sentence, the processor is further configured to create the support information which supports correction of the fourth information associated with the first information, wherein
the support information is created based on
a first search result obtained by searching the first information under a condition including the tag, and
a second search result obtained by searching the first information under a condition not including the tag.

16. The information processing apparatus according to claim 14, wherein the processor is further configured to create the support information which supports correction of the fourth information associated with the first information based on
the first information, and
evaluation information with respect to an inquiry from the user searched by a search model.

17. An information processing method, comprising, by a processor:
creating support information for supporting at least one of construction and maintenance of a database based on first information and second information, wherein
the first information includes
a plurality of first questions, wherein a first question of the plurality of first questions corresponds to a representative question which is a question sentence from a user assumed in advance, and
an answer sentence associated with the representative question,
the first information is stored in the database, and
the second information indicates a history information of the user;
extracting a first question of a plurality of second questions of the user from the second information;
controlling a display unit to display the extracted first question of the plurality of second questions;
controlling storage of third information, wherein the third information indicates a question example associated with the first information;
creating the support information for supporting at least one of construction and maintenance of the third information in the database; and
executing processing of the at least one of the construction and the maintenance of the database based on input information input to the created support information.

18. A non-transitory processor-readable medium having stored thereon, processor-executable instructions which, when executed by a processor, cause the processor to execute operations, the operations comprising:
creating support information for supporting at least one of construction and maintenance of a database based on first information and second information, wherein
the first information includes
a plurality of first questions, wherein a first question of the plurality of first questions corresponds to a representative question which is a question sentence from a user assumed in advance, and
an answer sentence associated with the representative question;
the first information is stored in the database; and
the second information indicates a history information of the user;
extracting a first question of a plurality of second questions of the user from the second information;
controlling a display unit to display the extracted first question of the plurality of second questions;
controlling storage of third information, wherein the third information indicates a question example associated with the first information;
creating the support information for supporting at least one of construction and maintenance of the third information in the database; and
executing processing of the at least one of the construction and the maintenance of the database based on input information input to the created support information.

* * * * *